United States Patent
Chowdhury et al.

(10) Patent No.: US 10,797,537 B2
(45) Date of Patent: Oct. 6, 2020

(54) DISTRIBUTED WIRELESS CHARGING SYSTEM AND METHOD

(71) Applicant: Northeastern University, Boston, MA (US)

(72) Inventors: Kaushik Chowdhury, Boston, MA (US); M. Yousof Naderi, Brookline, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 16/078,742

(22) PCT Filed: Mar. 13, 2017

(86) PCT No.: PCT/US2017/022106
§ 371 (c)(1),
(2) Date: Aug. 22, 2018

(87) PCT Pub. No.: WO2017/160723
PCT Pub. Date: Sep. 21, 2017

(65) Prior Publication Data
US 2019/0044392 A1     Feb. 7, 2019

Related U.S. Application Data

(60) Provisional application No. 62/308,298, filed on Mar. 15, 2016.

(51) Int. Cl.
*H02J 50/80*     (2016.01)
*H02J 50/12*     (2016.01)
(Continued)

(52) U.S. Cl.
CPC .............. *H02J 50/80* (2016.02); *H02J 7/007* (2013.01); *H02J 7/025* (2013.01); *H02J 50/12* (2016.02); *H01M 10/4257* (2013.01)

(58) Field of Classification Search
CPC .... H02J 2007/0098; H02J 50/12; H02J 50/80; H02J 7/007; H02J 7/025; H02J 17/00; H02J 7/00; H01Q 21/06; H01Q 9/40
See application file for complete search history.

(56) References Cited

U.S. PATENT DOCUMENTS 8,159,364 B2   4/2012   Zeine
8,447,234 B2   5/2013   Cook et al.
(Continued)

FOREIGN PATENT DOCUMENTS

WO     2016109315 A1    7/2016

OTHER PUBLICATIONS

Rahul, H., et al., "MegaMIMO: Scaling Wireless Capacity with User Demands", ACM SIGCOMM'12, Aug. 13-17, 2012, Helsinki, Finland.

(Continued)

*Primary Examiner* — Nathan S Taylor
(74) *Attorney, Agent, or Firm* — Verrill Dana, LLP

(57) ABSTRACT

A distributed wireless radio frequency-based charging system includes hardware and software platforms. The hardware platform includes adaptive energy harvesters and programmable energy transmitters. The software platform manages the hardware profiles, resources (e.g., energy waveforms and transmission powers), schedules the beams of the energy transmitters, and switches between modes of wireless charging and data access point. This allows the energy transmitters to be configured adaptively based on the ambient energy availability, energy needs and number of energy-requesting devices in the network. Under the software control, the energy transmitters can cooperatively form focused beams of energy and power for transmission to energy harvesters in the energy-receiving devices, such as sensors, Internet of Things (IoT) enabled appliances, and (Continued)

mobile/wearable equipment. The energy harvesters can utilize the energy contained within the transmitted beams, as well as ambient RF sources, for directly powering their operation or charging a battery/capacitor for subsequent use.

18 Claims, 23 Drawing Sheets

(51) Int. Cl.
*H02J 7/00* (2006.01)
*H02J 7/02* (2016.01)
*H01M 10/42* (2006.01)

(56) References Cited

U.S. PATENT DOCUMENTS

| | | | | |
|---|---|---|---|---|
| 9,841,784 | B2* | 12/2017 | Belogolovy | G06F 1/163 |
| 9,882,430 | B1* | 1/2018 | Leabman | H02J 17/00 |
| 9,949,219 | B2* | 4/2018 | Belogolovy | H02J 50/23 |
| 10,383,126 | B2* | 8/2019 | Gollakota | H02J 50/20 |
| 2006/0238365 | A1 | 10/2006 | Vecchione et al. | |
| 2007/0109121 | A1* | 5/2007 | Cohen | G06K 19/0707 |
| | | | | 340/539.26 |
| 2007/0257634 | A1* | 11/2007 | Leschin | H01L 41/113 |
| | | | | 320/107 |
| 2011/0309686 | A1* | 12/2011 | Scherbenski | H02J 7/025 |
| | | | | 307/104 |
| 2012/0007441 | A1 | 1/2012 | John | |
| 2012/0112534 | A1 | 5/2012 | Kesler et al. | |
| 2012/0119569 | A1 | 5/2012 | Karalis et al. | |
| 2012/0235504 | A1 | 9/2012 | Kesler et al. | |
| 2012/0235633 | A1 | 9/2012 | Kesler et al. | |
| 2012/0242159 | A1 | 9/2012 | Lou et al. | |
| 2012/0242225 | A1 | 9/2012 | Karalis et al. | |
| 2012/0248886 | A1 | 10/2012 | Kesler et al. | |
| 2012/0248887 | A1 | 10/2012 | Kesler et al. | |
| 2012/0249051 | A1 | 10/2012 | Son et al. | |
| 2012/0326660 | A1* | 12/2012 | Lu | H02J 17/00 |
| | | | | 320/108 |
| 2014/0021798 | A1* | 1/2014 | Kesler | H01F 38/14 |
| | | | | 307/104 |
| 2014/0375255 | A1* | 12/2014 | Leabman | H02J 7/025 |
| | | | | 320/108 |
| 2015/0022010 | A1 | 1/2015 | Leabman et al. | |
| 2015/0029397 | A1 | 1/2015 | Leabman | |
| 2015/0077036 | A1 | 3/2015 | Leabman et al. | |
| 2015/0256015 | A1* | 9/2015 | Gudan | H02J 7/345 |
| | | | | 307/104 |
| 2015/0256082 | A1* | 9/2015 | Gudan | H02J 7/025 |
| | | | | 320/108 |
| 2015/0256097 | A1* | 9/2015 | Gudan | H02M 3/338 |
| | | | | 363/125 |
| 2015/0303710 | A1* | 10/2015 | John | A61N 1/3785 |
| | | | | 307/104 |
| 2015/0372621 | A1 | 12/2015 | Brady et al. | |
| 2016/0099758 | A1* | 4/2016 | Bell | H02J 7/0027 |
| | | | | 307/104 |
| 2016/0181854 | A1* | 6/2016 | Leabman | H02J 50/60 |
| | | | | 320/108 |
| 2016/0181868 | A1 | 6/2016 | Casse et al. | |
| 2016/0183056 | A1* | 6/2016 | Leabman | H04W 4/025 |
| | | | | 455/456.3 |
| 2016/0191121 | A1* | 6/2016 | Bell | H04B 5/0037 |
| | | | | 307/104 |
| 2017/0098416 | A1* | 4/2017 | Taylor | G09G 3/344 |
| 2017/0237282 | A1* | 8/2017 | Huang | H02J 7/345 |
| | | | | 307/48 |
| 2018/0287418 | A1* | 10/2018 | Zeine | H02J 7/025 |

OTHER PUBLICATIONS

Quitin, F., et al., "A scalable architecture for distributed transmit beamforming with commodity radios: Design and proof of concept," IEEE Transactions on Wireless Communications, vol. 12, No. 3, pp. 1418-1428, Mar. 2013.

* cited by examiner

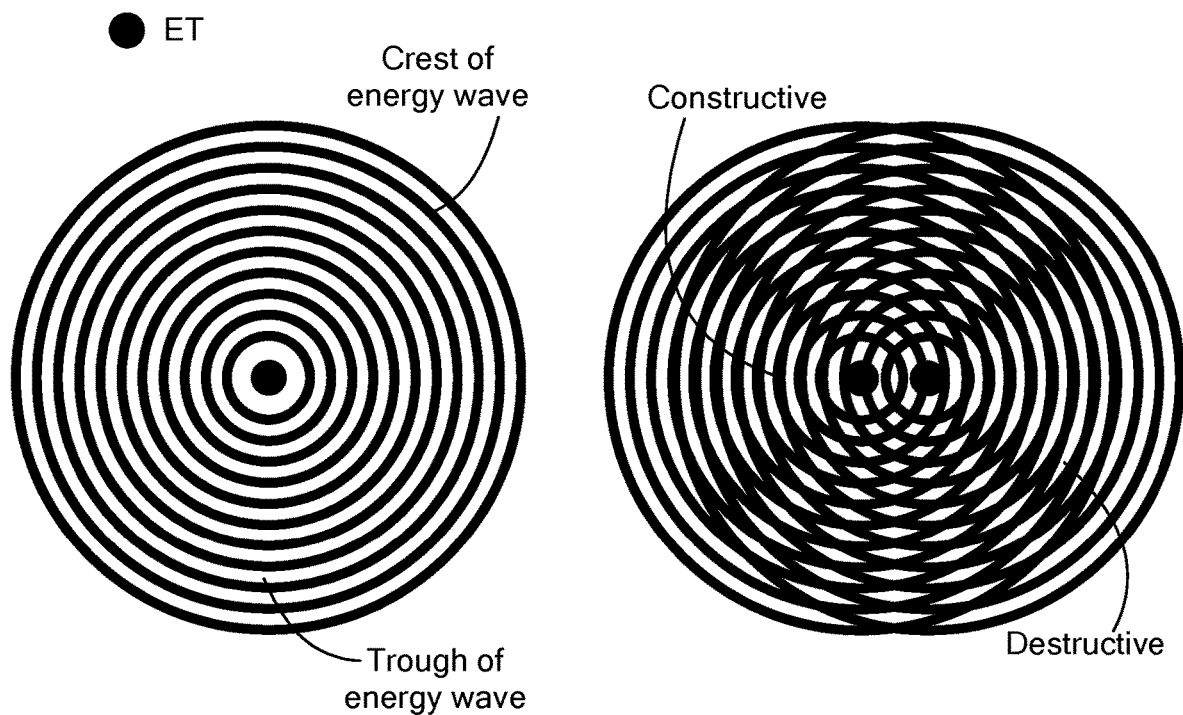
*FIG. 3A*  *FIG. 3B*
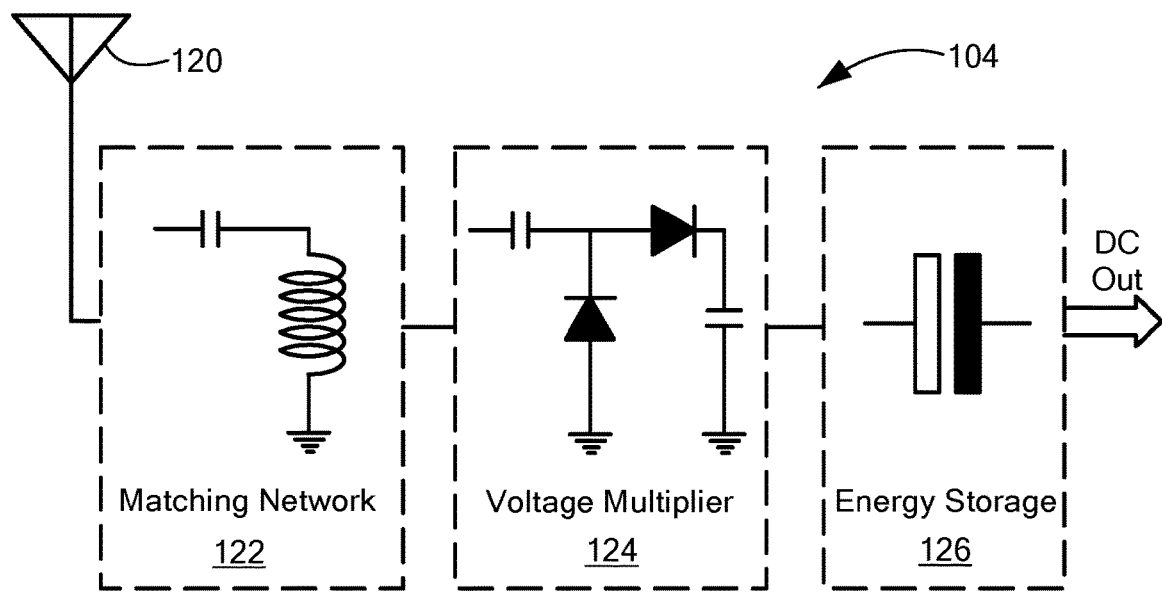
*FIG. 4*

DISTRIBUTED WIRELESS CHARGING SYSTEM AND METHOD

CROSS REFERENCE TO RELATED APPLICATIONS

This application claims priority under 35 § 119(e) of U.S. Provisional Application No. 62/308,298, filed on Mar. 15, 2016, entitled "Software-Defined Control Plane for Distributed Wireless Energy Transfer System," the disclosure of which is hereby incorporated by reference.

STATEMENT REGARDING FEDERALLY SPONSORED RESEARCH OR DEVELOPMENT

The invention was developed with financial support from Grant No. 1452628 from the National Science Foundation. The U.S. Government has certain rights in the invention.

BACKGROUND

Some estimates suggest that the number of connected devices worldwide will increase to 50-200 billion by 2020, with global spending reaching 1.7 trillion in that same year. Connected devices are used at multiple levels of society, from a personal level (for example, wearable devices) to a community level (for example, smart cities). In addition, energy consumption demands are increasing exponentially due to the development of processor-heavy applications, higher data communication rates and technologies, and increased usage of multimedia content. On the other hand, battery technology is constrained by limited space and is currently unable to keep up with the expansion of power needs. Replenishment and maintenance of batteries are costly and critical to device performance. Battery-related issues are a main concern in military, consumer, and commercial markets.

Wireless energy transfer is useful for charging rechargeable batteries, such as batteries used in sensors and mobile devices. Commercially available wireless charging systems have limitations such as low charging rates, need for line-of-sight alignment, and close contact with the device to be charged.

SUMMARY OF THE INVENTION

A method and system are provided to transfer energy wirelessly to power devices by employing distributed energy beam forming, ambient RF energy harvesting, or a combination thereof.

In some embodiments, a controllable, programmable distributed wireless radio frequency (RF)-based charging system and method are provided that include and utilize both hardware and software platforms. The hardware platform includes programmable energy transmitters (ETs) and adaptive energy harvesters coupled with energy-receiving target devices. The software platform remotely manages the hardware profiles and resources (e.g., energy waveforms and transmission powers), schedules energy transmissions from the energy transmitters, and commands switching of the ETs between two modes of RF energy transmission for wireless charging and data access point for data communication. This allows the energy transmitters to be configured adaptively based on the ambient energy availability, energy needs and number of energy-requesting target devices in a network. Under the software control, the energy transmitters can cooperatively form focused beams of energy to transmit power to a set of target devices using radio frequencies within, for example, a license-free industrial, scientific and medical (ISM) band. The energy-receiving target devices, such as sensors, Internet of Things (IoT) enabled appliances, and mobile and/or wearable equipment that are coupled with the adaptive energy harvesters, can utilize the energy contained within the transmitted beams, as well as ambient RF sources, for directly powering their operation or for charging a battery and/or capacitor for subsequent use. The coupled software and hardware platforms can flexibly monitor a wide range of areas, build live energy maps, estimate future energy demands, establish energy and data communications with devices, facilitate interoperability among devices, and detect and/or localize new devices within a coverage area.

Other aspects of the method and system include the following:

1. A method for distributed wireless charging, comprising:
   in a network comprising at least two spatially distributed energy transmitters, an energy receiving target device, and a controller comprising one or more processors and memory, and machine readable instructions stored in the memory executable by the one or more processors, the steps of:
   receiving, at the controller, a communication from the energy receiving target device or from one of the energy transmitters comprising a need for energy by the energy receiving target device; and
   transmitting, by the controller to the at least two energy transmitters, instructions for wireless transmission of radio frequency (RF) energy from the at least two energy transmitters to the energy harvesting target device.

2. The method of embodiment 1, further comprising:
   transmitting RF energy to form constructive interference at the energy harvesting target device by the at least two energy transmitters; and
   converting energy contained in the RF energy into electrical energy by energy harvesting circuitry in the energy harvesting target device for immediate use or for storage.

3. The method of any of embodiments 1-2, wherein each of the energy transmitters is operative to adjust one or more of a frequency, a phase, and a time of transmission of the RF energy to form constructive energy beams at the energy harvesting target device.

4. The method of any of embodiments 1-3, wherein the instructions transmitted by the controller include one or more of a power level to be transmitted, a duration of transmission, an identification of the energy receiving target device, and a schedule of transmission.

5. The method of any of embodiments 1-4, wherein the instructions transmitted by the controller include one or more of switching the energy transmitters on and off, changing a power level transmitted by each of the energy transmitters, and changing a duration of energy transmission of each of the energy transmitters.

6. The method of any of embodiments 1-5, wherein the instructions transmitted by the controller include active data communication protocols, the communications protocols including at least WiFi, ZigBee, and Bluetooth protocols; a role of each energy transmitter, the roles including an energy transfer mode and a data access point communication mode; and a duration of the roles of the energy transmitters.

7. The method of any of embodiments 1-6, further comprising transmitting, from the energy harvesting target device to one or more of the energy transmitters or to the controller, an indication of one or more of an energy discharging rate, an ambient RF energy harvesting rate, or an energy storage level at the energy harvesting target device.

8. The method of any of embodiments 1-7, further comprising transmitting feedback, from the energy harvesting target device to one or more of the energy transmitters, comprising an indication of a received signal strength from the energy transmitters or channel estimations.

9. The method of any of embodiment 8, further comprising, in response to the feedback, iteratively adjusting one or more of frequency, phase, or timing of the RF energy from one or more of the energy transmitters to optimize constructive interference at the energy harvesting target device.

10. The method of any of embodiments 1-9, wherein the energy harvesting target device further harvests RF energy from an ambient RF source.

11. The method of embodiment 10, wherein the ambient RF source is harvested from radio signals, cellular signals, global system for mobile (GSM) signals, or digital or analog television signals.

12. The method of any of embodiments 1-11, wherein the energy receiving target device is one of a set of multiple energy receiving target devices in the network, and the instructions include scheduling transmissions of energy over time to each of the energy receiving target devices.

13. The method of any of embodiments 1-12, wherein the energy receiving target device is one of a set of multiple energy receiving target devices in the network, and the controller is operative to apportion energy transmission between multiple ones of the energy harvesting target devices based on current energy levels of each energy harvesting target device, a number of the energy harvesting target devices, and an estimated future energy demand.

14. The method of any of embodiments 1-13, wherein the energy receiving target device is one of a set of multiple energy receiving target devices in the network, and the controller is operative to register, authenticate or track a location of each of the multiple energy harvesting target devices.

15. The method of any of embodiments 1-14, wherein the energy receiving target device is one of a set of multiple energy receiving target devices in the network, and the controller includes an energy map stored in the memory, the energy map comprising an updatable compilation of present and historical energy levels of the multiple energy harvesting target devices.

16. The method of any of embodiments 1-15, further comprising switching each of the energy transmitters between an energy transmission mode and a data communication mode.

17. The method of any of embodiments 1-16, wherein each of the energy transmitters comprises a software-defined radio configurable by communications from the controller, and an antenna in communication with the software-defined radio.

18. The method of any of embodiments 1-17, wherein one or more of the energy transmitters further comprise a data access point or a gateway for the network.

19. The method of any of embodiments 1-18, wherein the energy harvesting target device is a sensor, an Internet of Things-enabled device or appliance, a mobile device, an air-borne device, a wearable device, an implantable device, or a computing device.

20. The method of any of embodiments 1-19, wherein the energy harvesting target device includes energy harvesting circuitry operative to convert energy contained in RF energy into electrical energy for immediate use or for storage.

21. The method of embodiment 20, wherein the energy harvesting circuitry includes an antenna, a DC voltage rectifier in communication with the antenna, and an energy storage device in communication with the DC voltage rectifier.

22. The method of any of embodiments 20-21, wherein the energy harvesting circuitry includes a stage optimized for high RF to DC conversion efficiency for low input power levels and a stage optimized for high input power levels.

23. The method of any of embodiments 20-22, wherein the energy harvesting circuitry includes impedance matching circuitry to optimize RF to DC conversion efficiency over a desired frequency range.

24. The method of any of embodiments 20-23, wherein the energy storage device comprises a battery or a capacitor.

25. A system for distributed wireless charging, comprising:
a network comprising at least two spatially distributed energy transmitters, an energy receiving target device, and a controller comprising one or more processors and memory, and machine readable instructions stored in the memory executable by the one or more processors, the controller operative to carry out operations comprising:
receiving a communication from at least one energy harvesting target device; and
transmitting to at least two energy transmitters instructions for wireless transmission of radio frequency energy from the at least two energy transmitters to the energy harvesting target device.

26. The system of embodiment 25, wherein the controller is operative to transmit instructions including one or more of a power level to be transmitted, a duration of transmission, an identification of the energy receiving target device, and a schedule of transmission.

27. The system of any of embodiments 25-26, wherein the controller is operative to transmit instructions including one or more of switching the energy transmitters on and off, changing a power level transmitted by each of the energy transmitters, and changing a duration of energy transmission of each of the energy transmitters.

28. The system of any of embodiments 25-27, wherein the controller is operative to transmit instructions including active data communication protocols, the communications protocols including at least WiFi, ZigBee, and Bluetooth protocols; a role of each energy transmitter, the roles including an energy transfer mode and a data access point communication mode; and a duration of the roles of the energy transmitters.

29. The system of any of embodiments 25-28, wherein each of the energy transmitters is operative to adjust one or more of a frequency, a phase, and a time of transmission of the RF energy to form constructive energy beams at the energy harvesting target device.

30. The system of any of embodiments 25-29, wherein each of the energy transmitters comprises a software-defined radio configurable by communications from the controller, and an antenna in communication with the software-defined radio.

31. The system of any of embodiments 25-30, wherein one or more of the energy transmitters further comprise a data access point or a gateway for the network.

32. The system of any of embodiments 25-31, wherein one or more of the energy transmitters is operative to optimize constructive interference at the energy harvesting target device in response to the feedback, by iteratively adjusting one or more of frequency, phase, or timing of the RF energy.

33. The system of any of embodiments 25-32, wherein the energy receiving target device includes energy harvesting circuitry operative to convert energy contained in the RF energy into electrical energy for immediate use or for storage.

34. The system of embodiment 33, wherein the energy harvesting circuitry includes an antenna, a DC voltage rectifier in communication with the antenna, and an energy storage device in communication with the DC voltage rectifier.

35. The system of embodiment 34, wherein the energy storage device comprises a battery or a capacitor.

36. The system of any of embodiments 33-35, wherein the energy harvesting circuitry includes a stage optimized for RF energy conversion efficiency at low input power levels and a stage optimized for RF energy conversion efficiency at high input power levels.

37. The system of any of embodiments 33-36, wherein the energy harvesting circuitry includes impedance matching circuitry to optimize RF energy conversion efficiency over a desired frequency range.

38. The system of any of embodiments 25-37, wherein the energy harvesting target device is operative to further harvest RF energy from an ambient RF source.

39. The system of embodiment 38, wherein the ambient RF source is harvested from radio signals, cellular signals, global system for mobile (GSM) signals, or digital or analog television signals.

40 The system of any of embodiments 25-39, wherein the energy harvesting target device is operative to transmit, to one or more of the energy transmitters or to the controller, an indication of one or more of an energy discharging rate, an ambient RF energy harvesting rate, or an energy storage level at the energy harvesting target device.

41. The system of any of embodiments 25-40, the energy harvesting target device is operative to transmit, to one or more of the energy transmitters, feedback comprising an indication of a received signal strength from the energy transmitters or channel estimations.

42. The system of any of embodiments 25-41, wherein the energy receiving target device is one of a set of multiple energy receiving target devices in the network, and the controller is operative to transmit instructions including scheduling transmissions of energy over time to each of the energy receiving target devices.

43. The system of any of embodiments 25-42, wherein the energy receiving target device is one of a set of multiple energy receiving target devices in the network, and the controller is operative to apportion energy transmission between multiple ones of the energy harvesting target devices based on current energy levels of each energy harvesting target device, a number of the energy harvesting target devices, and an estimated future energy demand.

44. The system of any of embodiments 25-43, wherein the energy receiving target device is one of a set of multiple energy receiving target devices in the network, and the controller is operative to register, authenticate or track a location of each of the multiple energy harvesting target devices.

45. The system of any of embodiments 25-44, wherein the energy receiving target device is one of a set of multiple energy receiving target devices in the network, and the controller includes an energy map stored in the memory, the energy map comprising an updatable compilation of present and historical energy levels of the multiple energy harvesting target devices.

46. The system of any of embodiments 25-45, wherein the energy harvesting target device is a sensor, a sensor mote, an Internet of Things-enabled device or appliance, a mobile device, an air-borne device, a wearable device, an implantable device, or a computing device.

47. A control system for distributed wireless charging, comprising:
a controller comprising one or more processors and memory, and machine-readable instructions stored in the memory that, upon execution by the one or more processors cause the system to carry out operations comprising:
receiving a communication from at least one energy harvesting target device; and
transmitting to at least two energy transmitters instructions for wireless transmission of radio frequency energy from the at least two energy transmitters to the energy harvesting target device.

48. The control system method of embodiment 47, wherein the controller is operative to transmit instructions including one or more of a power level to be transmitted, a duration of transmission, an identification of the energy receiving target device, and a schedule of transmission.

49. The control system any of embodiments 47-48, wherein the controller is operative to transmit instructions including one or more of switching the energy transmitters on and off, changing a power level transmitted by each of the energy transmitters, and changing a duration of energy transmission of each of the energy transmitters.

50. The control system any of embodiments 47-49, wherein the controller is operative to transmit instructions including use of one or more of active data communication protocols, the communications protocols including at least WiFi, ZigBee, and Bluetooth protocols; a role of each energy transmitter, the roles including an energy transfer mode and a data access point communication mode; and a duration of the roles of the energy transmitters.

51. The control system of any of embodiments 47-50, wherein the controller is operative to transmit instructions including scheduling transmissions of energy over time to multiple energy receiving target devices.

52. The control system of any of embodiments 47-51, wherein the controller is operative to transmit instructions to apportion energy transmission between multiple energy harvesting target devices based on current energy levels of each energy harvesting target device, a number of the energy harvesting target devices, and an estimated future energy demand.

53. The control system of any of embodiments 47-52, wherein the controller is operative to register, authenticate or track a location of each of multiple energy harvesting target devices.

54. The control system of any of embodiments 47-53, wherein the controller includes an energy map stored in the memory, the energy map comprising an updatable compilation of present and historical energy levels of multiple energy harvesting target devices.

DESCRIPTION OF THE DRAWINGS

The invention will be more fully understood from the following detailed description taken in conjunction with the accompanying drawings in which:

FIG. 3A is a schematic illustration of a single energy transmitter illustrating crests and troughs of transmitted energy waves;

FIG. 3B is a schematic illustration of how multiple energy transmitters transmitting at the same frequency and random initial phases can cancel transferred energy in destructive areas and aggregate energy in constructive areas;

FIG. 4 is a schematic illustration of one embodiment of adjustable ambient RF energy harvesting circuitry;

DETAILED DESCRIPTION OF THE INVENTION

Figure 1:
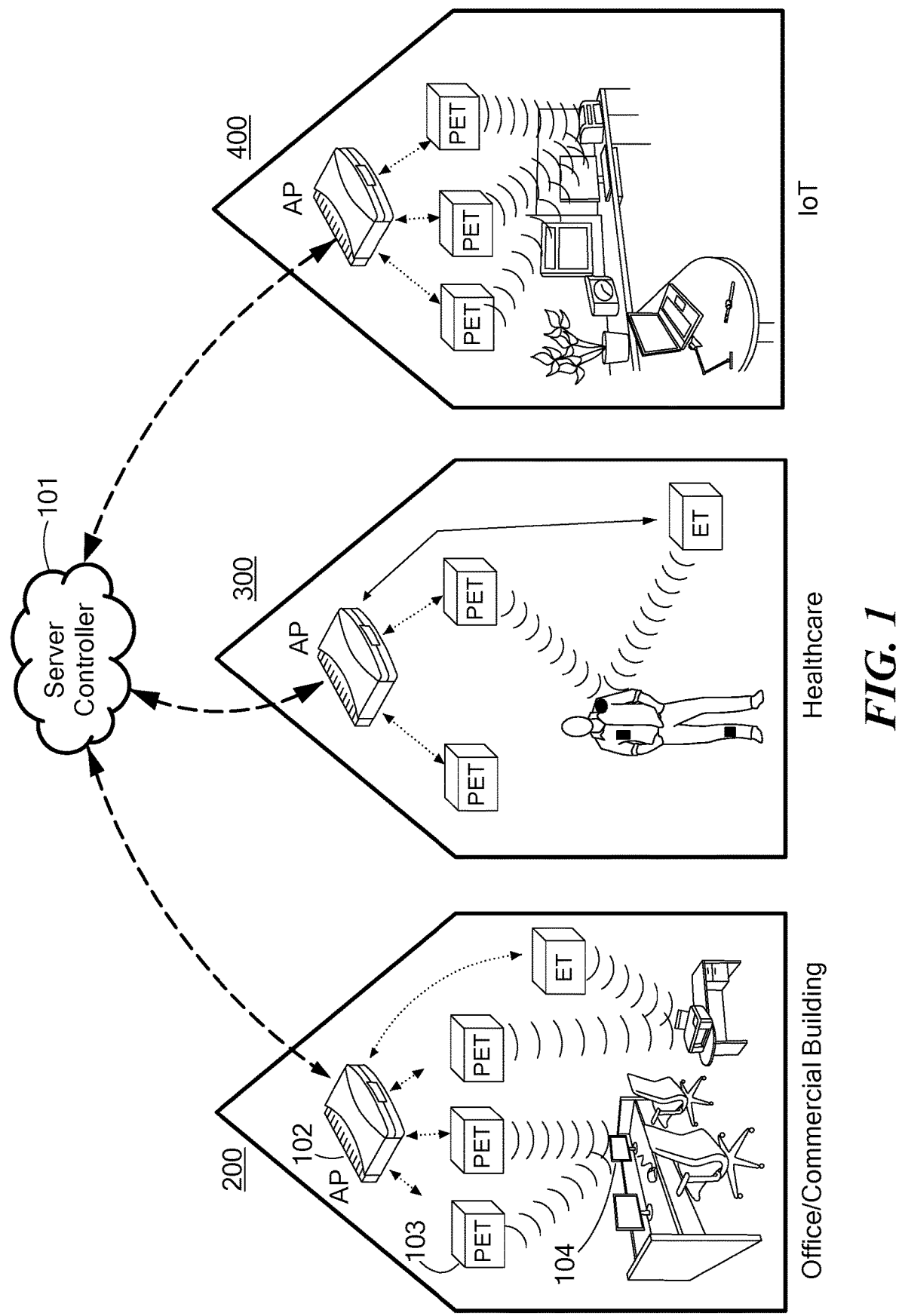
FIG. 1 is a schematic diagram of an embodiment of a software-defined distributed wireless charging system for three applications.

This application incorporates by reference the entire disclosure of U.S. Provisional Application No. 62/308,298, filed on Mar. 15, 2016, entitled "Software-Defined Control Plane for Distributed Wireless Energy Transfer System."

In some embodiments, a system and method include multiple programmable energy transmitters (ETs) distributed over a network to create and transmit beams of electromagnetic RF energy toward determined target devices in need of charging. The target devices include energy harvesters operable to receive the RF energy and convert it to electrical energy to charge or power the target device. A software platform provides various functionalities, such as, for example, managing the hardware resources, scheduling the energy beams, and switching between ET/access point roles.

For example, in some embodiments, various software-implemented modules can be provided at a controller or at the various ETs. Such modules can implement functionalities such as distributed energy beamforming to ensure adaptive and high coverage wireless charging rates; energy wave management for scheduling energy streams and constant monitoring of wireless charging progress; and reliable data and energy communication for the control aspects of requesting energy, registration and authentication of target devices, monitoring energy requirements of target devices, switching between energy transmission and data communication modes, and management of wireless standard compatible data communications over the network. Distributed energy beamforming can include features such as i) frequency, phase, and time synchronization, ii) localizing receivers, iii) managing a set of energy target devices, and iv) coordination of energy streams among a set of ETs.

In some embodiments, distributed wireless charging can include sending registration notifications from devices to the ETs and/or the controller through a local network or the Internet, registering and authenticating the devices at the controller, allocating resource parameters that define RF energy wave shapes, selecting an optimal subset of the available ETs in proximity to the energy requesting target devices, and scheduling and focusing of energy beams based on the current energy status of target devices in the network (including battery levels, the number of active target devices that have requested charging, and estimated future energy demands), sending configuration commands from the controller to the programmable ETs, transmitting the RF beams from distributed ETs to target devices based on determined schedules, capturing the energy beams by an energy harvester in the target device, and converting the incident RF energy into electrical energy for storage across a capacitor and/or battery or for immediate use, sending feedback from target devices to the ETs for phase and frequency correction of the energy beams, updating the energy and traffic status with energy update packets from a target device to the controller, creating visualizations of live energy maps at the controller to estimate future demands, and detecting a new energy requesting device in a coverage area by ETs.

In some embodiments, the energy harvester can include multi-band harvesting circuitry that harvests both controlled energy beams from the ETs and ambient RF energy.

In some embodiments, the ETs can have dual roles, as an energy transmitter and as a data access point. They can switch between an energy beamforming mode and a data communications mode, where in the latter mode, the ET can act as an access point/gateway for wireless standards compatible data communications such as WiFi, ZigBee, and Bluetooth. In the access point mode, the ETs can be responsible for communication, can exchange information through baseband digital packets, and can enable the interoperability of data communication among devices. In some embodiments, the ETs can have dual transceivers for operation simultaneously in the energy transmission mode and data communications mode.

In some embodiments, a dynamic and anticipatory energy scheduling can be employed. For example, target devices can have spatially and temporally varying energy needs based on their application-specific requirements. These different energy needs may benefit from different energy wave allocations, tailored to each specific device. The controller can use the latest aggregated energy updates and status of target devices to schedule the duration and transfer power from ET beams and can account for harvesting energy by the target devices from ambient RF sources to support current energy needs. Furthermore, anticipating application-specific traffic demands (based on node-initiated "energy reports" and live energy maps), the controller can direct the local ETs to provide power and charging times that are adequate to support estimated future energy needs.

In some embodiments, the system and method can provide distributed wireless charging from multiple ETs to one or more target devices while eliminating the need for contact-based or wireline charging, which may not be accessible or easy to use or which may make the target devices unusable during charging.

FIG. 1 illustrates a system overview of an embodiment of the present invention for distributed software-implemented wireless RF energy transmission to power electronic target devices. The target devices shown here can be any devices that are powered by electricity, such as, without limitation, a sensor or sensor mote, an Internet of Things-enabled device or appliance, a mobile device, a wearable device, an implantable device, an air-borne device, or a computing device. Such devices can include, without limitation, mobile phones, laptops, clocks, watches, temperature sensors, thermostats, and the like. Air-borne devices can include, without limitation, drones or unmanned aerial vehicles, powered airplanes, satellites, and the like.

The embodiment includes a software-implemented controller chain, from a controller 101 in communication with programmable energy transmitters (ETs or PETs) 103. In some embodiments, the controller can be implemented as or with a server. A distributed energy beamforming paradigm allows multiple distributed ETs to charge target devices 104 from a distance. A wireless access point mode allows ETs to switch to a data communication role to transmit/receive data to and from devices compatible with wireless standards. A power reception chain includes energy harvesters coupled to target devices for powering the target devices. In some embodiments, programmable ETs within each charging area can be connected to the controller through a commercially available WiFi access point (AP) 102. In some embodiments, the ETs can be plugged directly into regular electrical sockets or outlets of a power system of, for example, a building. In some embodiments, the ETs can be hardwired directly into the power system. In some embodiments, the ETs can be mounted externally on walls and/or ceilings.

The controller can build a database of knowledge of the network through feedback from the ETs and/or the target devices and can subsequently manage the energy waves emitted by the ETs by sensing re-configuration commands and intelligent beam scheduling. The distributed ETs can generate coordinated RF beams toward the target devices sequentially based on a schedule from the controller. The energy harvester in the target device may use the energy beams, as well as ambient RF energy, for replenishing the energy storage, for example, in a capacitor or battery, thereby allowing the device to run without battery replacements. The controller can perform similar energy transfer optimizations for a large number of deployment scenarios, also considering any global interference scenarios between groups of ETs controlled by different users or installed by distinct establishments. The set of target devices that are served at any given time, and the schedules of the distributed energy beams can change adaptively, based on the energy demands and energy status of a network notified to the software controller. In some embodiments, the ETs can switch to a data access point mode where each ET can communicate independently with one or more devices to exchange digital packets. Three example applications that are shown in FIG. 1 are an office/commercial building 200, a body area network 300 including sensors connected to a human subject for monitoring the body/health conditions, and an Internet of Things (IoT) scenario 400 with multiple appliances in a smart home.

Figure 2:
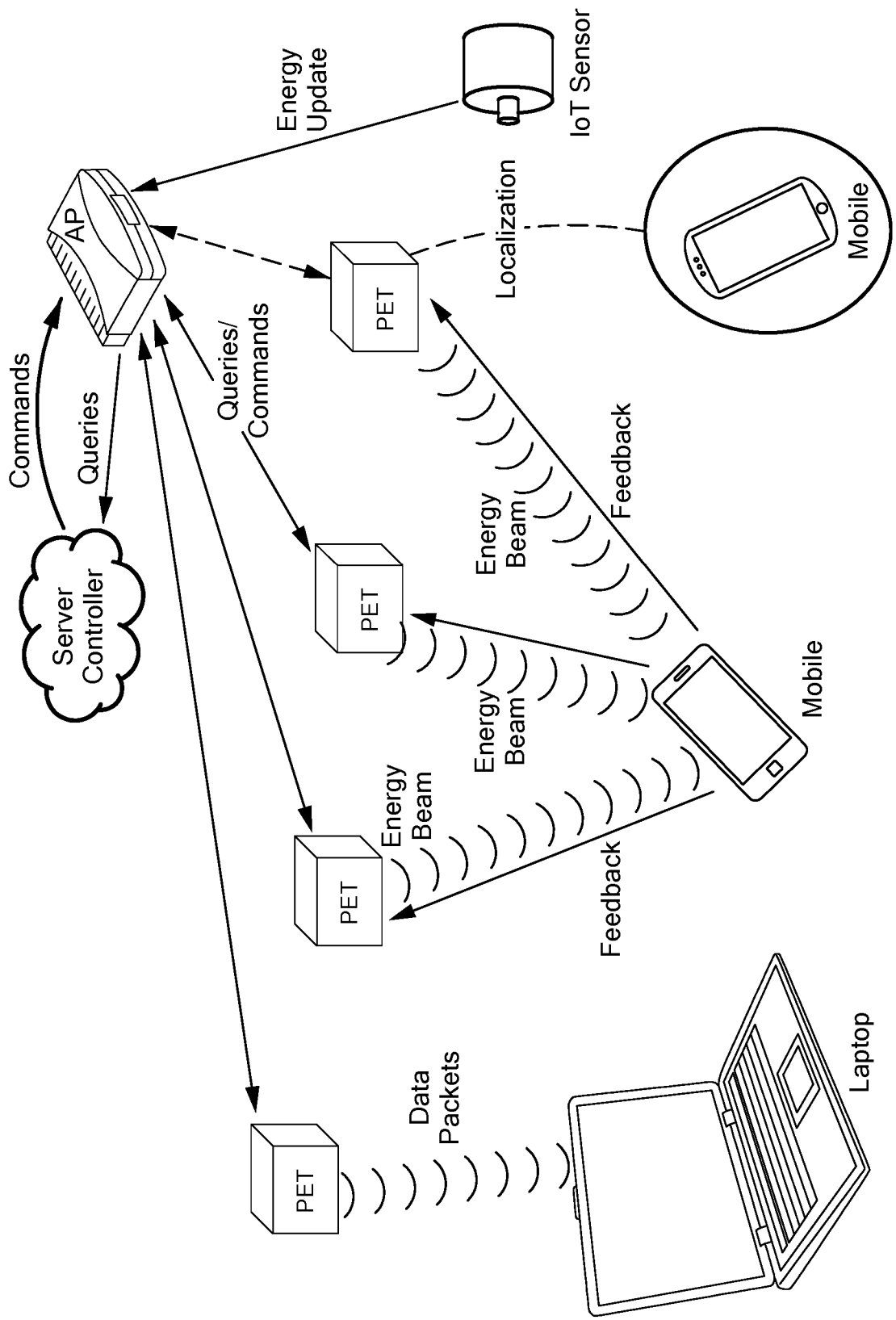
FIG. 2 is a schematic illustration of an embodiment software-defined beamforming methodology.

Referring to FIG. 2, in some embodiments, a system includes a set of programmable ETs, RF-energy harvesting circuits at each target device, and a controller with controlling software. The controller manages the energy-related resources such as transmit power, beam durations, active targeted device(s), and beam schedules, while feedback from the devices can be used by each ET independently for frequency, time, and phase synchronization to form constructive energy beams. The system can have any desired number n of ETs with independent frequency and clock references to transfer RF waves that combine at a receiver constructively. In some embodiments, a transmit antenna at each ET can be connected to an independent software defined radio, with its own crystal oscillator that regulates timing. Different oscillators naturally have different frequency and phase shifts with respect to each other, which also drift over their operation time. On the other hand, in a network with multiple ETs, the RF waves can combine constructively and destructively over the space based on the initial transmission phase, wireless channel, and relative distance of participating ETs. Due to this complexity and the nature of RF signals, the amount of received power from multiple ETs is not a simple superposition of the individual values, but the summation of received signals in phasor form.

FIGS. 3A and 3B illustrate how concurrent energy transmissions at the same frequency cancel the transferred energy in destructive areas and aggregate energy in constructive areas. FIG. 3A illustrates a two-dimensional pattern of transferred energy produced by a single ET, and FIG. 3B illustrates a two-dimensional pattern of transferred energy produced by multiple ETs, showing the areas of constructive and destructive interferences.

The programmable ET can each include a Universal Software Radio Peripheral (USRP) connected to a power amplifier. The USRPs can implement a beamforming algorithm for phase and frequency synchronizations and can transfer high power energy signals toward the desired target device using the power amplifier with maximum allowable power under FCC rules. Using distributed energy beamforming, the ETs can self-adjust their phase based on feedback from the target device, so that maximum net energy is transferred towards the intended target device. In particular, the ETs can organize themselves into a virtual antenna array and focus their transmission energy in the direction of the target device, such that the emitted waveforms add up constructively at the target device. Each ET can use Kalman filtering techniques, such as an extended Kalman filter, to estimate and correct the frequency offset between its carrier frequency and the feedback as reference signal.

The target devices include energy harvesting circuitry that can convert the incident RF energy into a DC voltage stored in a storage device, such as a battery or capacitor or for immediate use. In some embodiments, the RF-energy harvesting circuit at each target device can include an antenna for receiving incoming RF energy, a DC voltage rectifier, and an energy storage device, such as a capacitor or battery, to receive a DC voltage from the voltage rectifier. An impedance matching circuit can be provided between the antenna and the voltage rectifier to maximize the energy transfer and minimize power reflection between the antenna and the voltage rectifier. A tunable impedance matching network can allow the optimal operating frequency range to be adjusted to maximize RF to DC conversion efficiency over any desired frequency range without a need for new circuitry fabrication.

In some embodiments, the sensor can estimate the received signal strength (RSS) of the net incoming signal and broadcast a single bit to all the ETs to indicate whether this value is higher or lower than that measured in the previous time slot. If the RSS is higher, the ETs can update this information and perturb their phase setting using the last setting as the baseline. If the RSS is lower, the ETs can revert their phase selection to that of the previous time slot, before beginning the subsequent round of phase perturbation. This randomized ascent procedure is repeated until the ETs converge to phase coherence. There is a synchronization period for phase adjustments among ETs, where the system converges to an optimal value in a few seconds time using the sensor-generated feedback.

In some embodiments, the target devices can include energy harvesting circuitry to harvest ambient RF energy from RF sources such as, without limitation, radio signals, cellular signals, global system for mobile (GSM) signals, or digital or analog television signals. FIG. 4 illustrates a schematic overview of an embodiment of an adjustable ambient RF energy harvesting device 104. The components include an antenna 120, an impedance matching network 122, a voltage multiplier 124, and energy storage 126. The incident RF power is converted into DC power by the voltage multiplier. The impedance matching network, which can include inductive and capacitive elements, provides a maximum power delivery from the antenna to the voltage multiplier. The energy storage provides smooth power delivery to the load and provides a reserve for durations when external energy is unavailable. The number of multiplier stages is selected to optimize performance. For example, increasing the number of multiplier stages gives higher voltage at the load, yet reduces the current through the final load branch. This may result in unacceptable charging delays for the energy storage capacitor. Conversely, fewer multiplier stages can provide more rapid charging of the capacitor, but the voltage generated across it may be insufficient to drive the device, such as a sensor mote. Similarly, a slight change in the matching circuit parameters can alter significantly the frequency range in which the efficiency of the energy conversion is a maximum, in some cases by several MHz. Thus, the RF harvesting circuitry can be designed in consideration of the optimum choices for a particular application.

In some embodiments, the controller can determine an appropriate time to switch an ET's role from wireless energy transfer to data communication and vice versa. The described distributed energy beamforming allows ETs to emulate a software-defined and scalable virtual multiple-input multiple output (MIMO) system that can transmit N concurrent streams to one or more devices that can give an improvement of $N^2$ in the gain of the received power. More generally, some or all of the multiple ETs and all or some of devices can have multiple antennas. A new device can register and authenticate itself to the controller before receiving energy, and can be automatically localized by ETs within its network depending upon the number of ETs that are within its range. The charging target devices can send energy updates to the controller over time, informing about the change in their energy demands, and the controller can issue reconfiguration commands to satisfy the energy needs of the network based on the energy updates.

Figure 5:
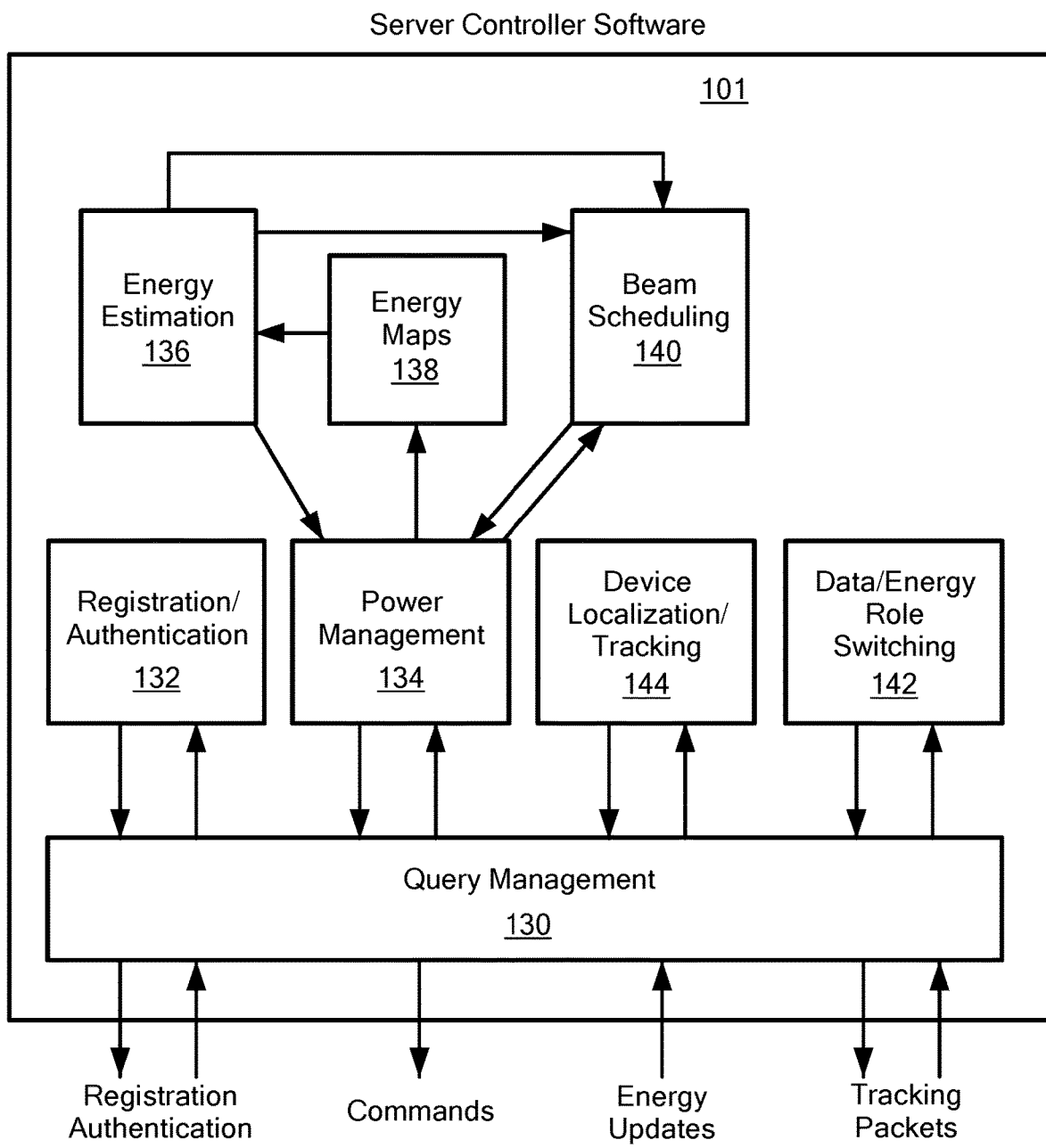
FIG. 5 is a block diagram of an embodiment of a software controller.

FIG. 5 illustrates a component level embodiment for a controller 101, which can be utilized to adaptively control the ETs and provide distributed wireless charging as described in FIG. 1. The controller can include various software-implemented modules, such as query management 130, registration/authentication 132, power management 134, energy estimation 136, energy maps 138, beam scheduling 140, energy/data role switching 142, and device tracking 144. The query management module can receive and process queries such as registration/authentication of target devices and energy updates from target devices and also relay the configuration commands and tracking queries. The power management module can allocate optimal resources within ETs, such as transmission power, duration, and targeted devices for charging. Upon reception of energy updates, the query management module forwards them to the power management module, which then builds the latest energy map of the network. These maps capture the latest energy status and recent history of energy needs for each target device. The energy estimation module can use the energy maps to estimate future energy demands. The energy maps and energy estimations can be given to the beam scheduling module, which optimizes the scheduling of energy beams to satisfy the new energy demands. The energy map can also be returned to a user for viewing purposes. The power management module can send the reconfiguration commands through the query management module to the ETs. The tracking module can send tracking packets to ETs for localizing a new device upon receipt of a registration or authentication query and when changes in a device location are detected. The data/energy role switching module can decide to send commands to an ET to switch its role between energy transmitter and data access point.

Figure 6:
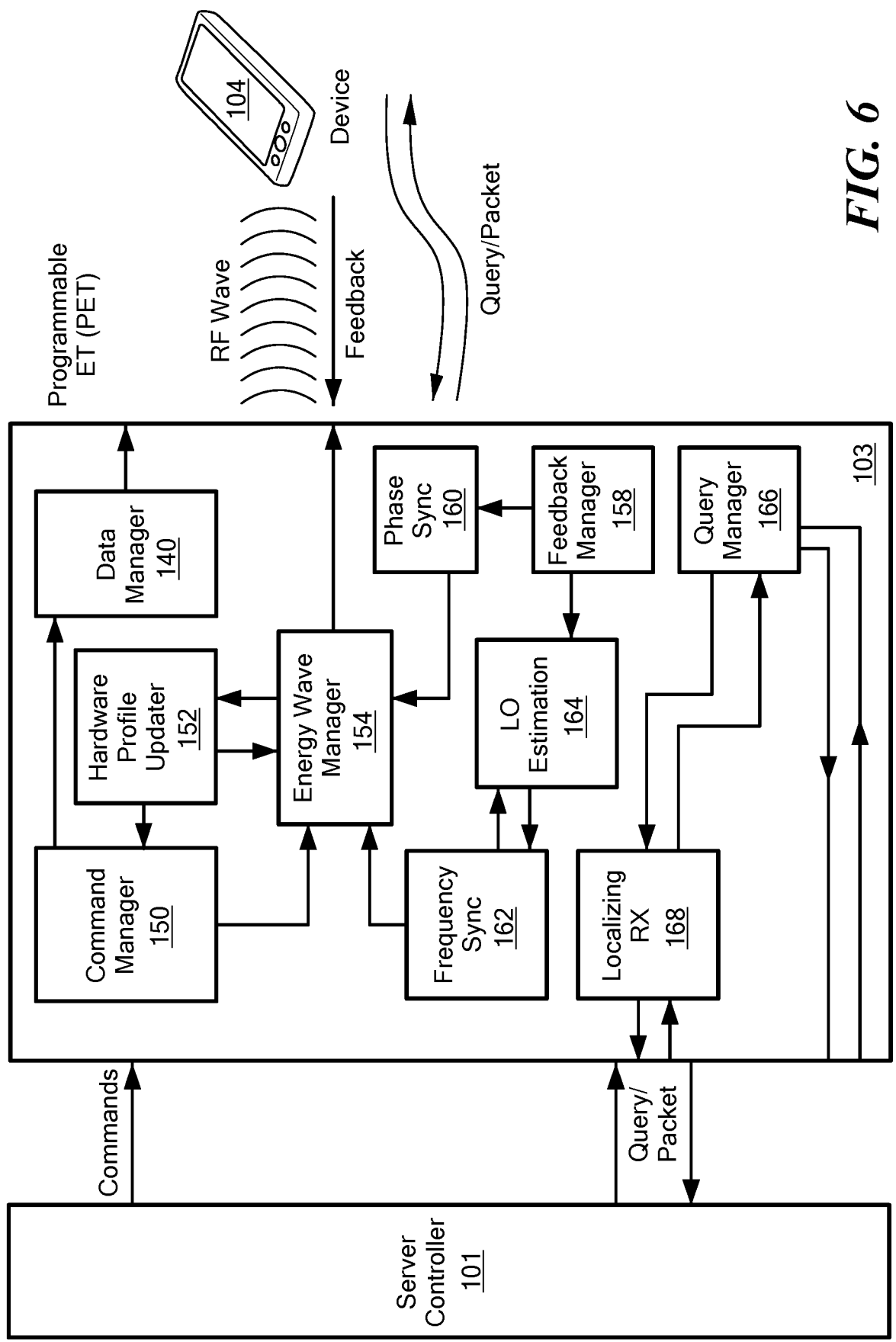
FIG. 6 is a block diagram of an embodiment of a programmable ET.

FIG. 6 illustrates the component level embodiment for a programmable ET 103, which can be used for transferring RF power toward the desired electronic devices. A programmable ET can include various software-implemented modules, such as a command manager 150, hardware profile updater 152, energy wave manager 154, feedback manager 158, phase sync 160, frequency sync 162, LO estimator 164, query manager 166, Rx localizer 168, and data manager 170. The ET processes any commands from the controller 101 by the command manager module and passes the requested updates in transmission power, duration, and beam schedules for each active target device 104 to the hardware profile updater that keeps and manages the hardware-related parameters. Feedback from a target device can be processed through the feedback manager module, which, in turn, connects to the local oscillator (LO) estimator, frequency sync, and phase sync modules for adjusting/correcting the errors local frequency and phase of ET to create constructive interference at the receiver of the target device. The query manager in the ET can be used for passing the energy updates from the target device to the controller and also process tracking requests from the controller. The energy wave manager allocates beam streams according to the received commands from the controller, including beam schedules, updated hardware profiles, adjusted frequency, and adjusted phase. The data manager is responsible for implementing the functions of protocol specific data communications, e.g., WiFi, ZigBee, and Bluetooth, to exchange data packets when the controller changes the ET's role to an access point.

Figure 7:
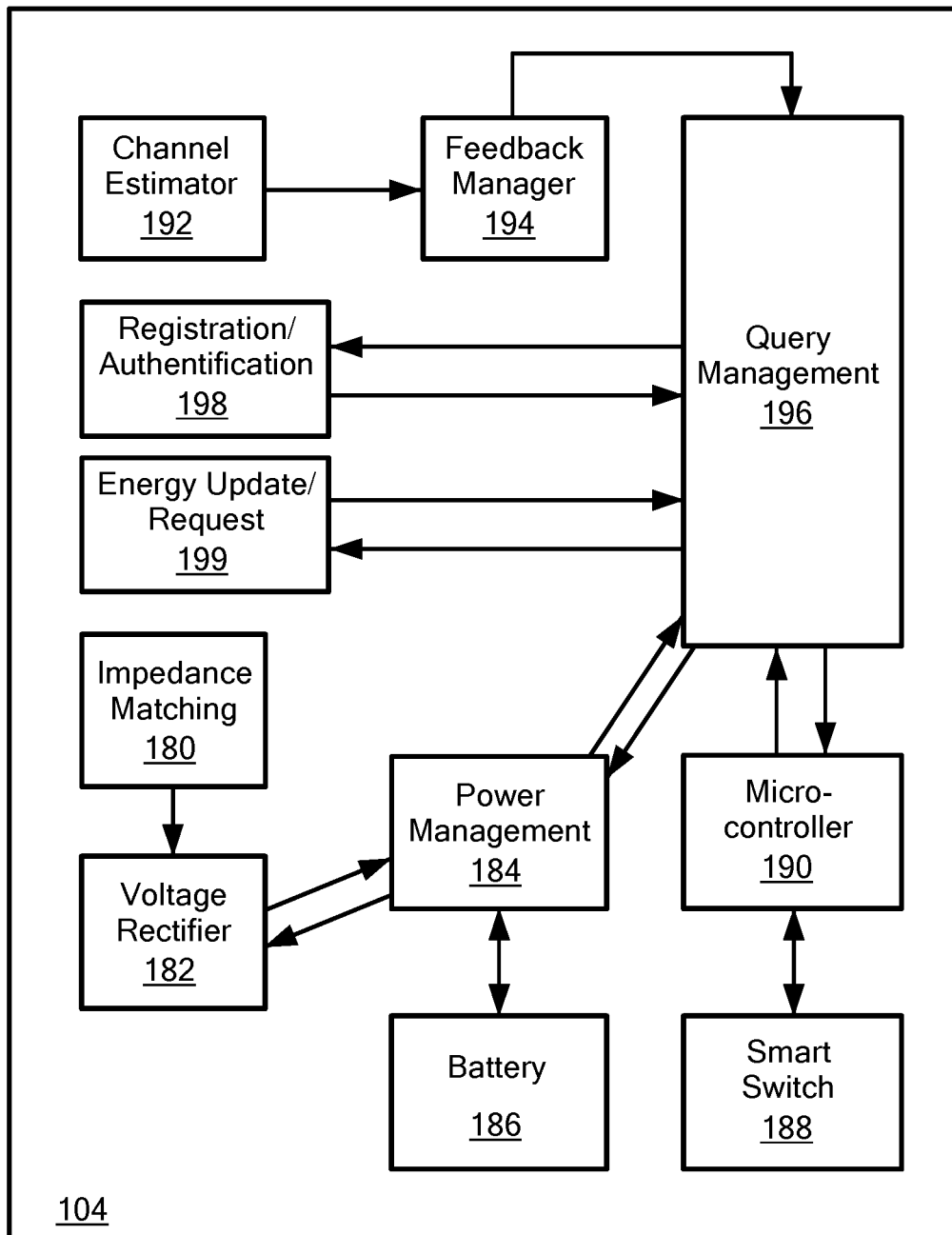
FIG. 7 is a block diagram of an embodiment of an energy harvester coupled with a receiver device.

FIG. 7 illustrates a component level embodiment for an integrated multi-band energy harvester coupled with a receiver at a target device 104 that can be used for charging or powering the device as described in FIGS. 1 and 2. The integrated energy harvester can include various software-implemented modules, such as impedance matching 180, voltage rectifier 182, power management 184, battery 186, smart switch 188, micro-controller 190, channel estimator 192, feedback manager 194, query management 196, registration/authentication 198, and energy update manager 199. The integrated energy harvester receives the energy beams as well as ambient power and converts them from RF to DC. The harvesting process can be optimized by the power management module, which reconfigures the impedance and rectifier parameters. The channel estimator can measure the channel periodically and forward these channel parameters to the feedback manger, where, based on previous channel states and measured powers, precise feedback for ETs can be created. The query management module can handle the messages from registration/authentication, energy update, and feedback manager modules for energy requests, energy updates, and feedback.

Figure 8:
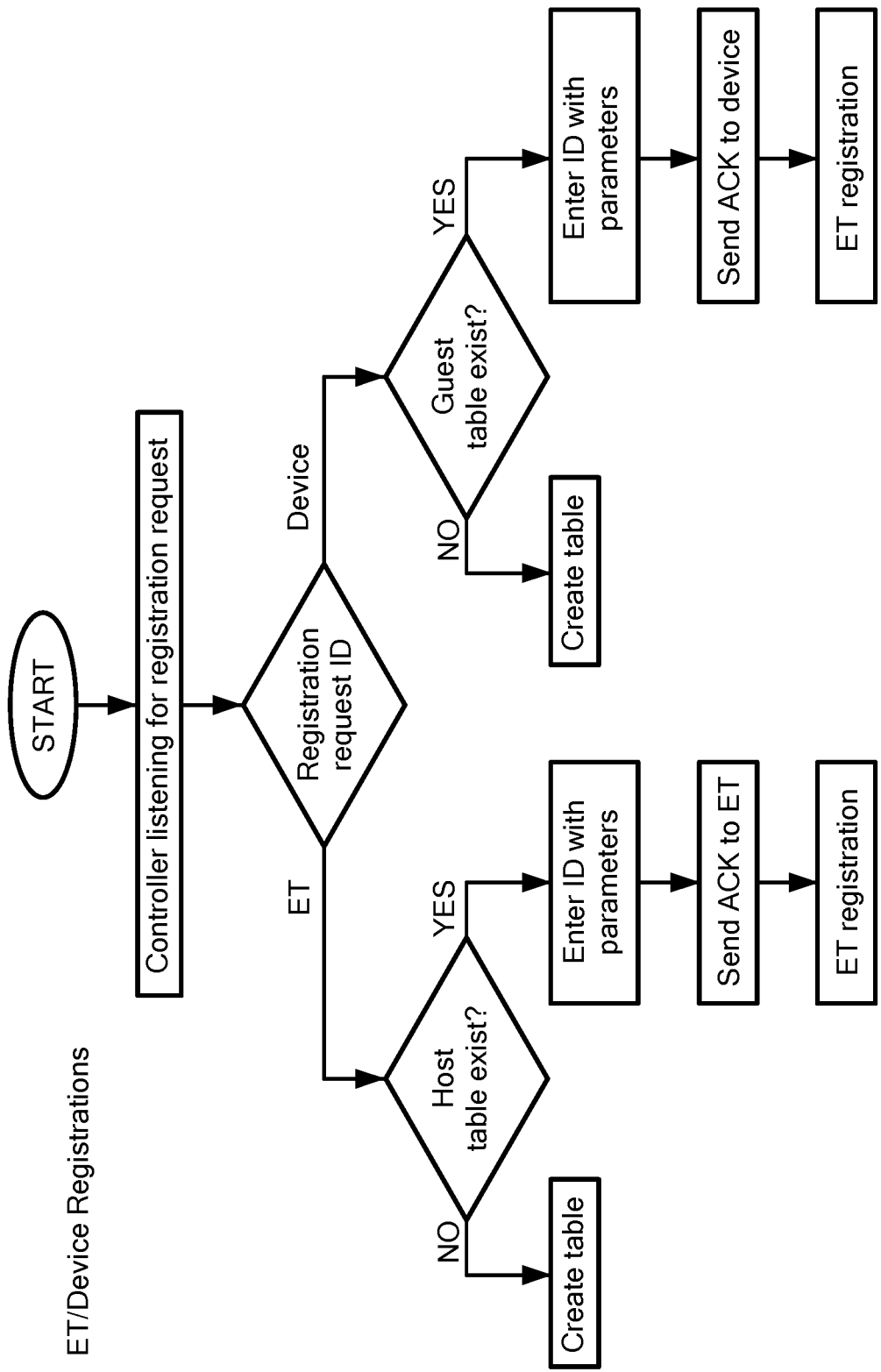
FIG. 8 illustrates a flow chart of an embodiment of a process of ET/device registration.

FIG. 8 illustrates an adaptive resource allocation example of an ET/device registration process. The controller parses all the incoming queries using the query management module. If a registration message is detected, the controller extracts the request type/ID which refers to either an ET or a target device. Then, the controller registers the ET or the target device with its reported parameters that have been included in the registration message, for example, accordingly into a host table (for ETs) or a guest table (for devices). The controller sends an appropriate ACK to the ET or device to inform of a successful completion of registration.

Figure 9:
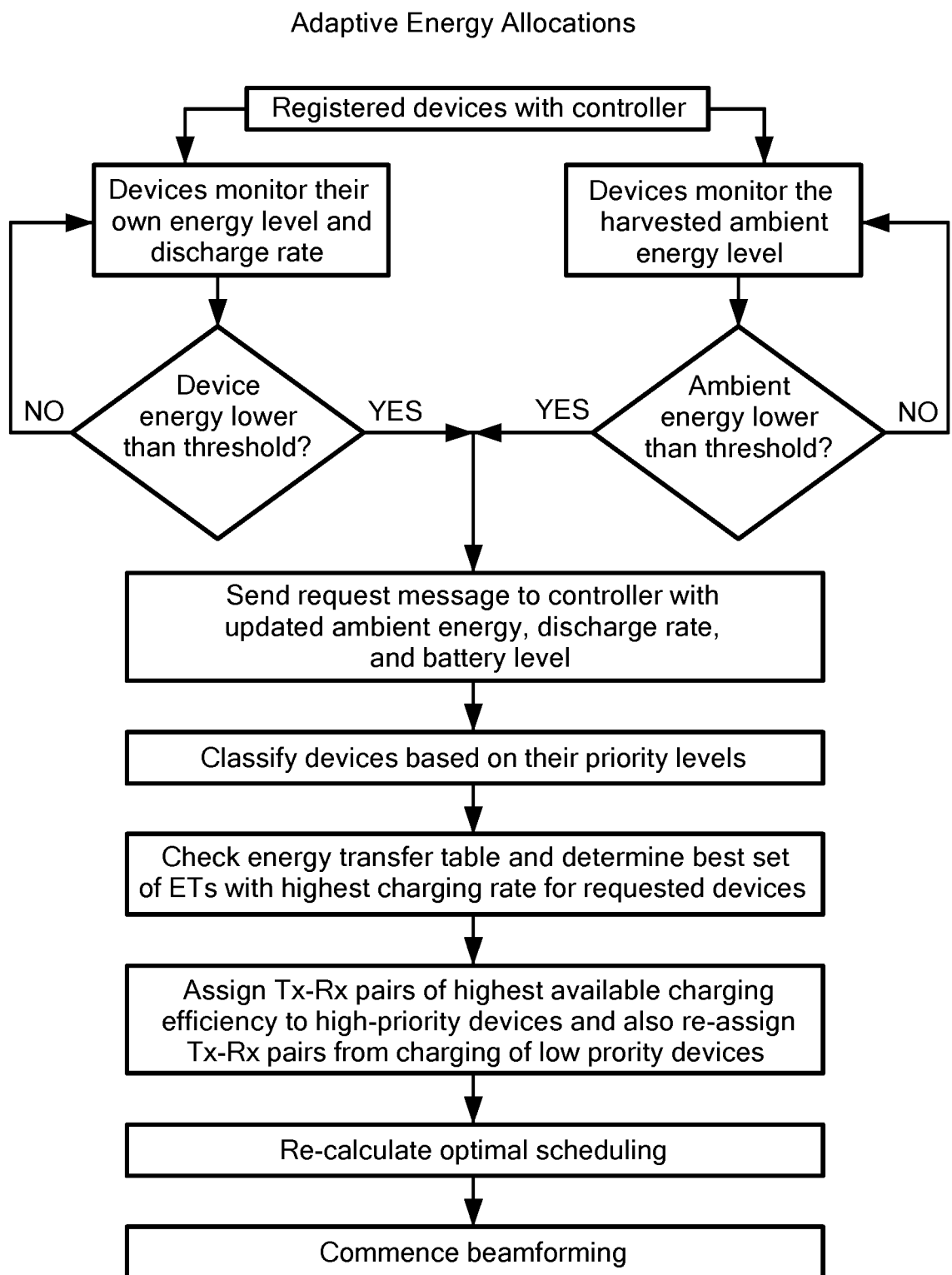
FIG. 9 illustrates a flow chart of an embodiment of a process of adaptive energy allocations based on RF ambient power and discharging rate changes.

FIG. 9 depicts an embodiment of a process of adaptive energy allocations. The controller constantly monitors the registered devices for their change of energy discharging rates, rates of ambient RF harvesting, and battery levels utilizing the energy updates from the target devices. Each registered device through the RF energy harvester can observe and monitor the level of ambient harvesting rate as well as battery level.

When any of the monitored parameters goes below a specific threshold, an energy request message can be initiated from the device to the controller. Such message contains the updated values of ambient energy, discharge rate, and battery level. The controller can classify the devices based on their conditions into different priority levels. It then determines a set of ETs to serve the highest priority devices by checking the energy transfer table. The energy transfer table contains the end-to-end RF-to-DC conversion efficiency for each set of ETs and device. This number can be a function of a number of parameters including the distance between ETs and a target device, RF-harvesting circuit, and transmission power.

In an initialization phase, the controller estimates these rates using measured harvested powers that are reported from the devices. After updating the best set of ETs and highest priority devices, the controller re-calculates the optimal energy beam-forming scheduling, and sends commands to ETs regarding their schedules/parameters.

Figure 10:
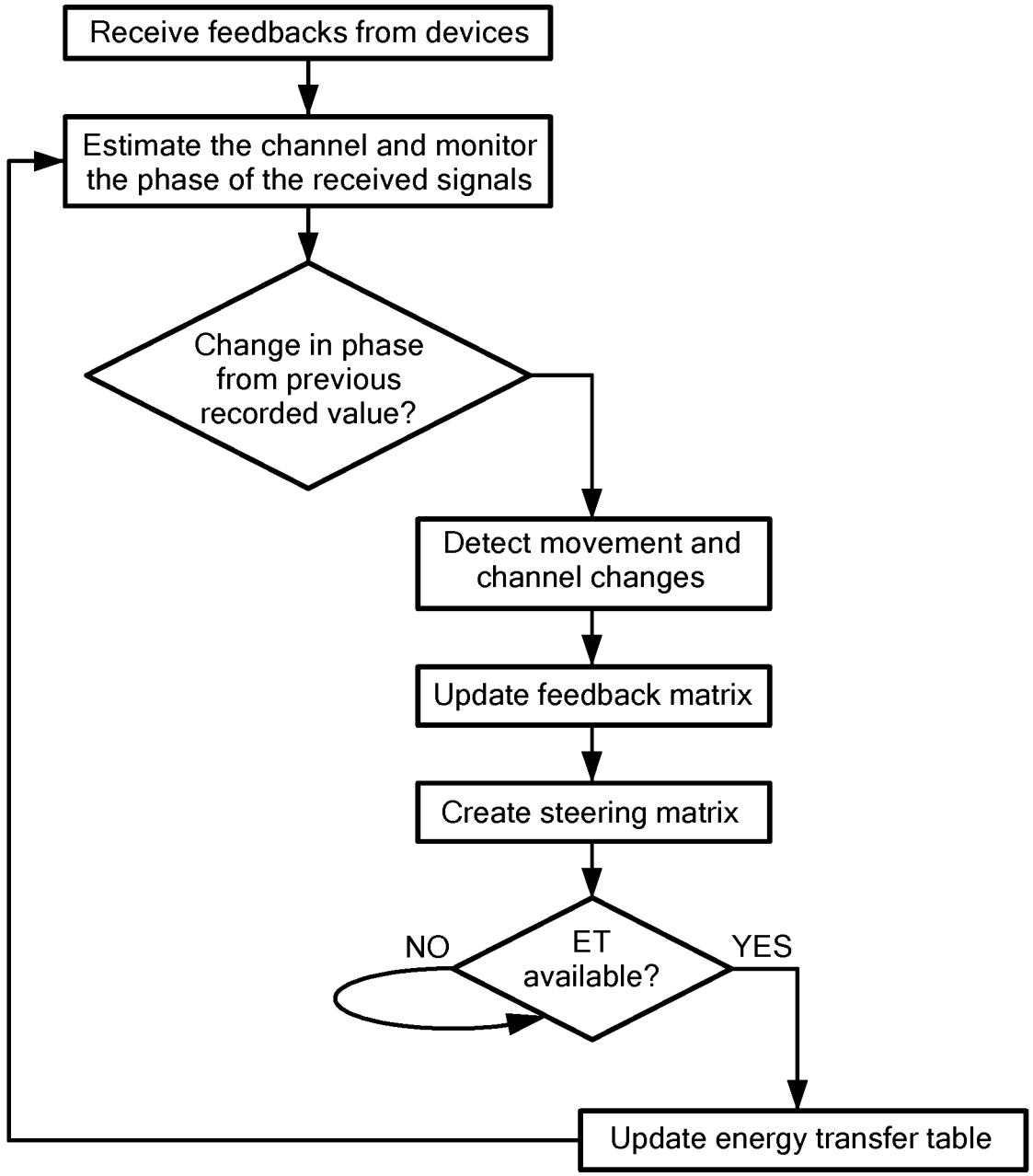
FIG. 10 illustrates a flow chart of an embodiment of a process of system adaptations to device movements and wireless channel changes.

FIG. 10 shows an embodiment of a process of adapting to any device movement and wireless channel change. Each ET can receive feedback from its target device. This feedback can be utilized to estimate the channel and the arrival phase of signals transmitted between the ET and the device. The ET can determine any changes in the channel or location change of the target device through this estimated phase, and updates the feedback and steering matrices to provide continuous and accurate energy beam forming. The ET can inform the controller about the new changes and the energy transfer table can be updated accordingly.

Figure 11:
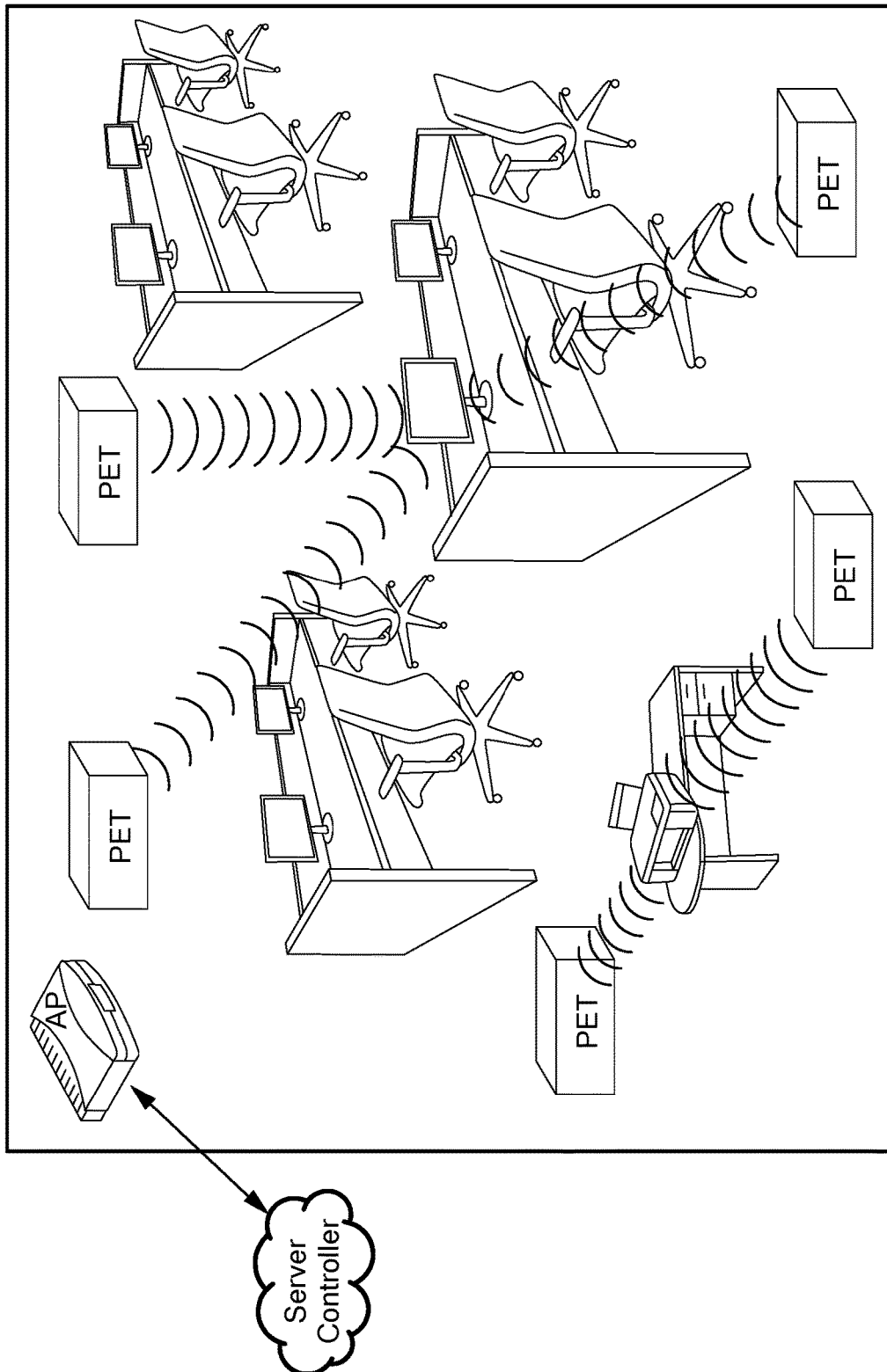
FIG. 11 is a diagram of an example application of an embodiment for office/commercial building charging.

FIG. 11 is an example embodiment of a distributed wireless charging service in an office or commercial building where the environment may be more dynamic such that energy demands as well as the number of active/new devices change rapidly. The programmable ETs and target devices can connect to the controller at a server through an access point (AP). The distributed ETs can be powered through a power distribution system and can be mounted or integrated to power outlets or structures in the building such as in walls or ceilings. The target devices can register/authenticate to the wireless charging service through the controller, and the distributed ETs can generate RF waves that combine constructively at a determined target device where the energy beams can be harvested to power or charge the device as described herein. Each target device, such as, without limitation, a phone, mouse, monitor, laptop, printer, voice recorder, shredder, projector, or any other electronic device requiring a power input, can be coupled with an integrated RF harvester. The controller can monitor the status of the whole network by building energy maps, and can track the presence of the target devices by utilizing the distributed ETs that are located at the local network of devices. Energy demands of the target devices can change over time, and new devices can join the energy network and existing devices can leave. The controller can detect and manage these changes by sending new commands, including new energy wave configurations and beam scheduling, to the distributed ETs. The controller can schedule ETs such that they sequentially change their target devices over energy duty-cycles to charge multiple devices. The coverage and intensity of the wireless charging can depend on the number of ETs. Additional ETs can be placed to reach greater distances, support a greater number of targets, and achieve higher charging rates. The controller can create groups of cooperative ETs, in which each group can have a different set of target devices for distributed energy beamforming. The controller can change the role of an ET from energy transmitter to data access point, where an ET becomes responsible for communication and exchanges information through digital packets compatible with specific wireless standards.

Figure 12:
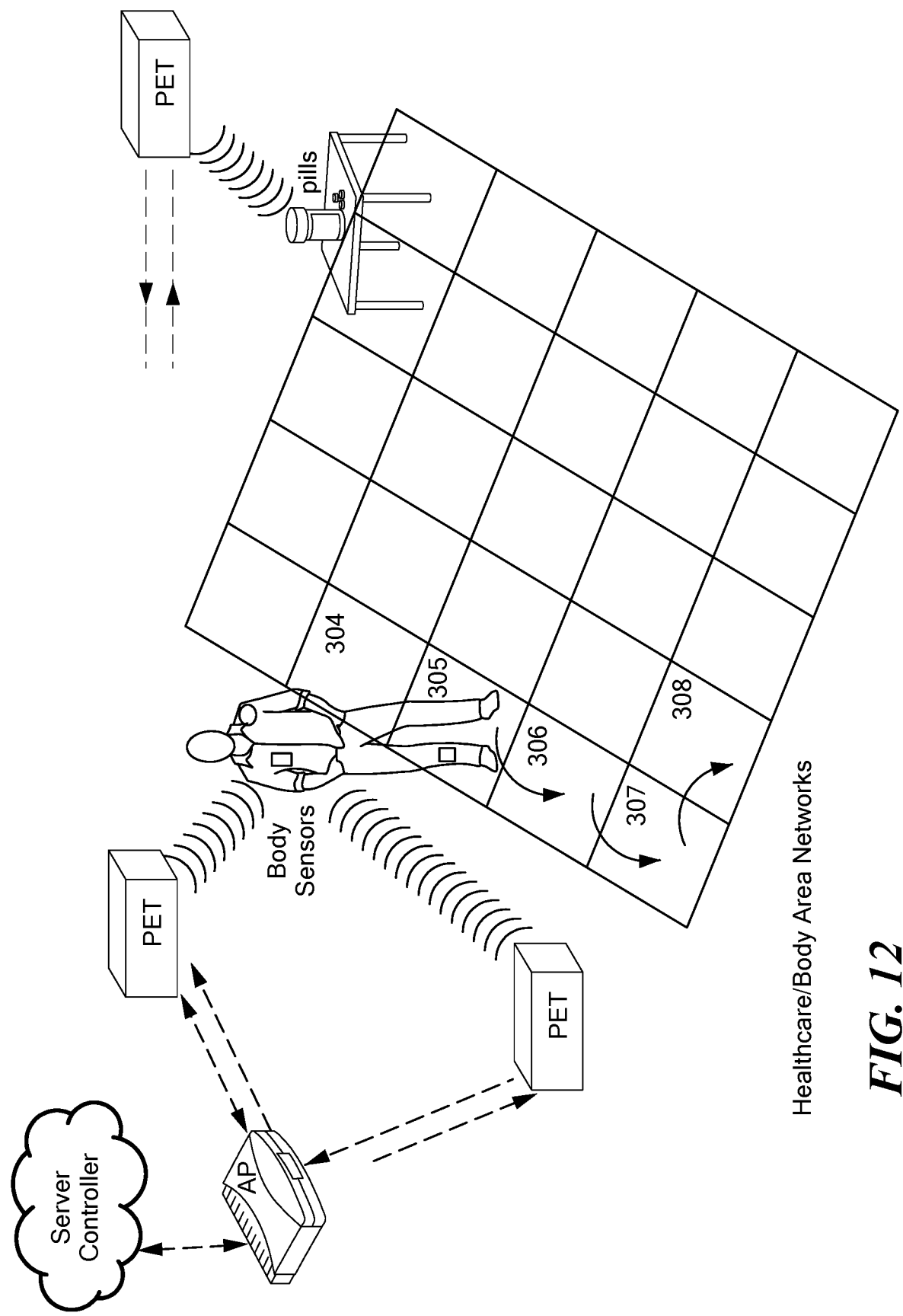
FIG. 12 is a diagram of an example application of an embodiment for healthcare and medical device charging.

FIG. 12 is an example embodiment of software-defined distributed wireless charging system for a health application to power a network of wearable computing devices. The devices can be implanted, surface-mounted on a body, carried on the person of a human subject via embedding them in clothes or bags, or placed in a fixed location (e.g., pill reminder). The devices can be coupled with integrated RF harvesters for continuous monitoring and logging vital parameters. In this embodiment, the continuous charging of devices when they move, with either a low or high rate, can be a useful factor to provide safe and reliable health monitoring performances. The controller can manage this issue through tracking of the devices by utilizing distributed ETs and can adapt the power and scheduling of energy waves accordingly. The ETs can utilize feedback from the devices to adapt and adjust the phases of energy waves in order to combine all RF signals constructively at each determined device.

Figure 13:
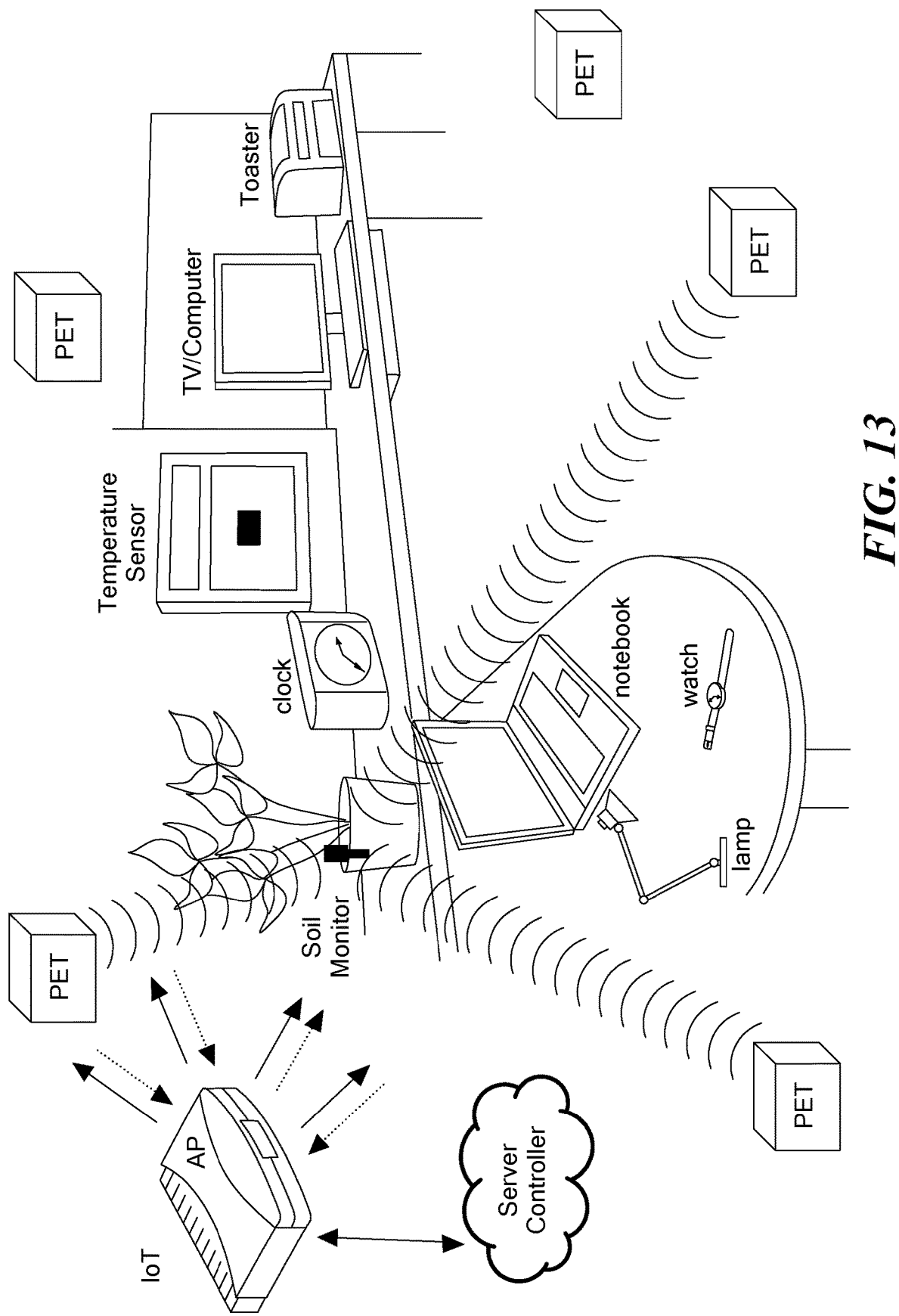
FIG. 13 is a diagram of an example application of an embodiment for Internet of Things (IoT) charging.

FIG. 13 is another embodiment of a distributed wireless charging system for an IoT network in a smart home. A diverse set of smart sensors associated with target IoT devices, such as, without limitation, a temperature controller, soil monitor, toaster controller, smart lamp, watch, clock, TV/monitor, and notebook, can be connected through an access point (AP) with each other and a network such as the Internet. The controller can allocate the optimal energy streams, and the distributed ETs can transmit energy waves accordingly, to create constructive interference at sensors of each target device. Each target device can be coupled with an integrated RF harvester, and can utilize the beams of energy produced by the distributed ETs for charging or powering the sensors. Besides the controlled energy beams, the IoT devices can utilize ambient power from sources, such as an LTE network, GSM network, and digital TVs to charge or power the sensors. In this embodiment, the power manager and energy scheduling modules in the controller, as described above, can leverage the more static behavior of an IoT network and energy maps to anticipate and provide future energy needs in advance.

In some embodiments, a distributed wireless charging system or method can include one or more of registration/authentication of a device to a controller for receiving wireless energy services; resource allocation of energy beams and their schedules by a controller for distributed wireless energy transfer toward a set of given targets through sending commands from a controller to multiple spatially distributed programmable ETs; transmitting RF energy beams to form constructive interference at each determined target by multiple spatially distributed ETs; converting energy contained in RF beams into DC storage by integrating a smart energy harvester hardware with devices.

In some embodiments, a distributed wireless charging system or method can further include one or more of receiving ambient RF power, from sources such as cellular and digital TV, besides the controlled energy beams, and converting them into DC power at the energy requesting device by the integrated energy harvester; and the integrated energy harvester broadcasting channel state information as well as energy update feedbacks to ETs and a controller.

In some embodiments, a distributed wireless charging system or method can further include the intelligent adaptation of energy waves based on changes in available ambient powers as well as energy demands on the network that are reported and measured by utilizing energy feedbacks from devices. These embodiments can further include the anticipatory energy scheduling with controller software based on learning a pattern of energy usages/demands and estimating future energy needs in advance. These embodiments can still further include information such as energy request and energy updates from spatially distributed ETs being integrated in the controller software for accurate and reliable energy estimation and allocation.

In some embodiments, a distributed wireless charging system or method can further include modulating energy waves or shaping them into short pulses in order to maximize the harvesting output powers. These embodiments can utilize the hardware-centric characteristics, such as RF-to-DC conversion efficiency curves of energy harvesters, to form the input signals, accordingly.

In some embodiments, a distributed wireless charging system or method can further include the controller switching on and off ETs, and changing their transmit power and transmit durations in order to extend or limit charging distance and charging rates of the system. These embodiments can further include localizing and tracking the locations of devices for reliable and continuous energy transfer in the applications with mobility such as health-care and also in dynamic environments with user traffic, such as office/commercial buildings.

In some embodiments, a distributed wireless charging system or method can include switching between energy beamforming and wireless standard compatible data communication modes, such as WiFi, ZigBee, and Bluetooth, and determining schedules of switching, ETs that need to change their roles, and data communication durations.

In some embodiments, a distributed wireless charging system or method can include controlling, allocating, and/or scheduling multiple spatially distributed ETs to beamform energy to a set of targets over a given time.

In some embodiments, a distributed wireless charging system or method can include adapting wireless charging to the energy demands of the network.

In some embodiments, a distributed wireless charging system or method can include anticipating future demands based on learning the usage/demand patterns.

In some embodiments, a distributed wireless charging system or method can include providing security, flexibility, and ease of use.

In some embodiments, a distributed wireless charging system or method can include integrating energy information (such as energy needs, updates, requests) from distributed devices in one place.

In some embodiments, a distributed wireless charging system or method can include commanding ETs to shape energy signals to maximize energy harvesting rates by utilizing energy harvesting circuit characteristics.

In some embodiments, a distributed wireless charging system or method can include leveraging ambient RF energy besides the controlled energy beams.

In some embodiments, a distributed wireless charging system or method can include accurately localizing a new device and tracking its location and energy needs for reliable and continuous energy transfer.

In some embodiments, a distributed wireless charging system or method can include scheduling and commanding ETs to switch between energy transmitter and access point roles, and supporting data communications with devices that are equipped with wireless compatible standards radio transceivers.

The wireless charging system and method described herein can be used in a variety of applications. For example, the wireless charging market includes small-factor, battery-powered electronic devices that can be used for personal (consumer market), business (industrial/commercial markets), and military uses. Market segments for wireless charging can include homes, hotels/hospitality, military, malls, coffee shops, restaurants, hospitals, factories, vehicles, and smart cities. Applications of embodiments of this invention can include, but are not limited to, equipment in commercial buildings, offices and sensors in industrial machine floors, Internet of Things (IoT) enabled devices and appliances, and health-care.

By way of further examples, in the healthcare field, wireless charging can be used for medical and wearable devices, in-body as well as health-related electronic devices outside the body. In the automotive field, wireless charging can be used for electronic devices inside a vehicle. In commercial buildings, wireless charging can be used for electronic devices such as laptops, smart-phones, and sensors inside office/commercial buildings. In restaurants & coffee shops, wireless charging can be used for electronic devices such as smart-phones and laptops. In a smart city, wireless charging can be used for a variety of sensors, for example, to monitor the structural health of buildings/ bridges, to monitor roads, lighting, waste management, water quality, air pollution, and the like. In a smart home, wireless charging can be used for electronic devices such as laptops and smart phones, as well as for a variety of sensors that can be utilized in a home, such as of remote control sensors and switches, lamps, watches, temperature controllers, smoke alarms, electric toothbrushes, and the like.

Embodiments of the technology described herein can provide various advantages. For example, embodiments can ensure that devices remain operational for longer times, increase reliability, save time, save money, provide freedom from the location constraints of wired charging, eliminate the efforts of battery replacements, realize the next-generation wireless-powered IT infrastructure, and eliminate the efforts for wired-charging hardware installations. The technology can increase revenue and customer experience for businesses that provide a wireless charging service to customers or guests. End users can customize and visually monitor the performance of the ongoing charging process.

The system and method can provide higher levels of adaptation and configurability for wireless charging through a software-defined architecture with controller software and programmable ETs.

The system and method can provide higher wireless charging rates as well as charging distances through spatially distributed wireless beamforming compared to omni-directional RF energy transfer.

The system and method can provide greater flexibility, security, and ease of use through integrated and centralized management, distributed energy transfer, intelligent adaptations, and learning-based estimations.

The system and method can provide efficient and high levels of RF harvesting through inclusion of an integrated multi-band harvester that captures and adapts to both ambient and controlled energy beams.

The system and method do not need a tight alignment between the chargers and the target devices, or short-contacts as in the case of non-radiative coupling-based charging technologies, such as inductive coupling, magnetic resonance coupling, and capacitive coupling.

The system and method can provide higher reliability and scalability for dynamic and mobile applications.

The system and method can provide enhanced functionality by supporting both wireless charging and wireless standard compatible data communications.

The system and method can enhance data communication interoperability between devices through programmable energy transmitters that act as access point and support different wireless standards, for example, WiFi, ZigBee, and Bluetooth.

In some embodiments as used herein, "software-defined beamforming" may refer to controlling the phase, frequency, duration, direction, and power of energy beams from distributed programmable ETs through a remote software controller, which has access to the integrated energy and data knowledge of network through a network connection. "Distributed energy charging" may refer to a process of generating two or more RF waves that constructively combine at an intended receiver from physically separated ETs. In the case of multiple receivers, the waves may be scheduled over time to sequentially cover all energy requesting devices from the target set. "Programmable ET or PET" may refer to a wireless charger that transmits high power RF waves, and is equipped with software-defined radios, so that it may be reconfigured through commands from the software controller. "Software manager/controller" may refer to a controller that performs the overall messaging and control operations spanning device registration to fine-grained tuning of the ET operation. It adaptively and remotely manages the construction and emission of the energy waves and their schedules based on the energy needs of the network. "Anticipatory energy scheduling" may refer to configuring energy waves such that they can provide adequate power to support estimated future node operations. "Smart energy harvester" may refer to a multi-band RF harvester with an integrated smart switch that allows harvesting of energy beams as well as selection of one or more specific ambient bands of interest based on available channels and spectral power levels adaptively. It also provides efficient and sharp rectification of signals from a single source with the highest power. In various examples described herein, the "receiver" generally includes a device connected to the energy harvester. "Device registration" may refer to a process of registration and authentication of an energy requesting target device with the controller in order to receive wireless energy delivery. "Live energy maps" may refer to dynamic updating maps of energy levels of devices in the network that may be utilized to estimate the future energy demands as well as present a visualization of the energy status of the devices for an end-user. "Energy update" may refer to packets from a device to the software controller that updates the status of its traffic rates as well as level of energy, and may include other energy-related fields. "Switching modes" may refer to two processes: (i) the process of switching from the role of energy transmitted to the data access point, and transmission of data packets based on a wireless standard such as WiFi, ZigBee, and Bluetooth; (ii) the process of switching from data access point to the role of energy transmitter, and beamforming energy. "Transceiver" may include one or more devices that both transmit and receive signals, whether sharing common circuitry, housing, or a circuit board, or whether distributed over separated circuitry, housings, or circuit boards, and can include a transmitter-receiver.

The software provided to perform the example operations within the embodiments disclosed herein may be any computer-readable instructions configured to cause a processor or apparatus to perform the example operations. The instructions may be stored on any non-transitory, computer-readable medium, and, when loaded and executed by a processor, causes the processor or associated apparatus to perform the example operations.

The controller, energy transmitters, and energy harvesting target devices can be part of a computer system(s) that executes programming for controlling the system for wireless charging as described herein. The computing system(s) can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic device, masked-programmed gate arrays, field programmable gate arrays (FPGAs), and application specific integrated circuits (ASICs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, microphones, displays, touchscreens, monitors, scanners, speakers, and printers. Interfaces can include universal serial bus (USB) ports, serial ports, parallel ports, and the like.

The computing device can access a network over a network connection that provides the computing device with telecommunications capabilities. Network connection enables the computing device to communicate and interact with any combination of remote devices, remote networks, and remote entities via a communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system(s) can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), test environment as a service (TEaaS), API as a service (APIaaS), and integration platform as a service (IPaaS).

EXAMPLES

Example 1

Figure 14A:
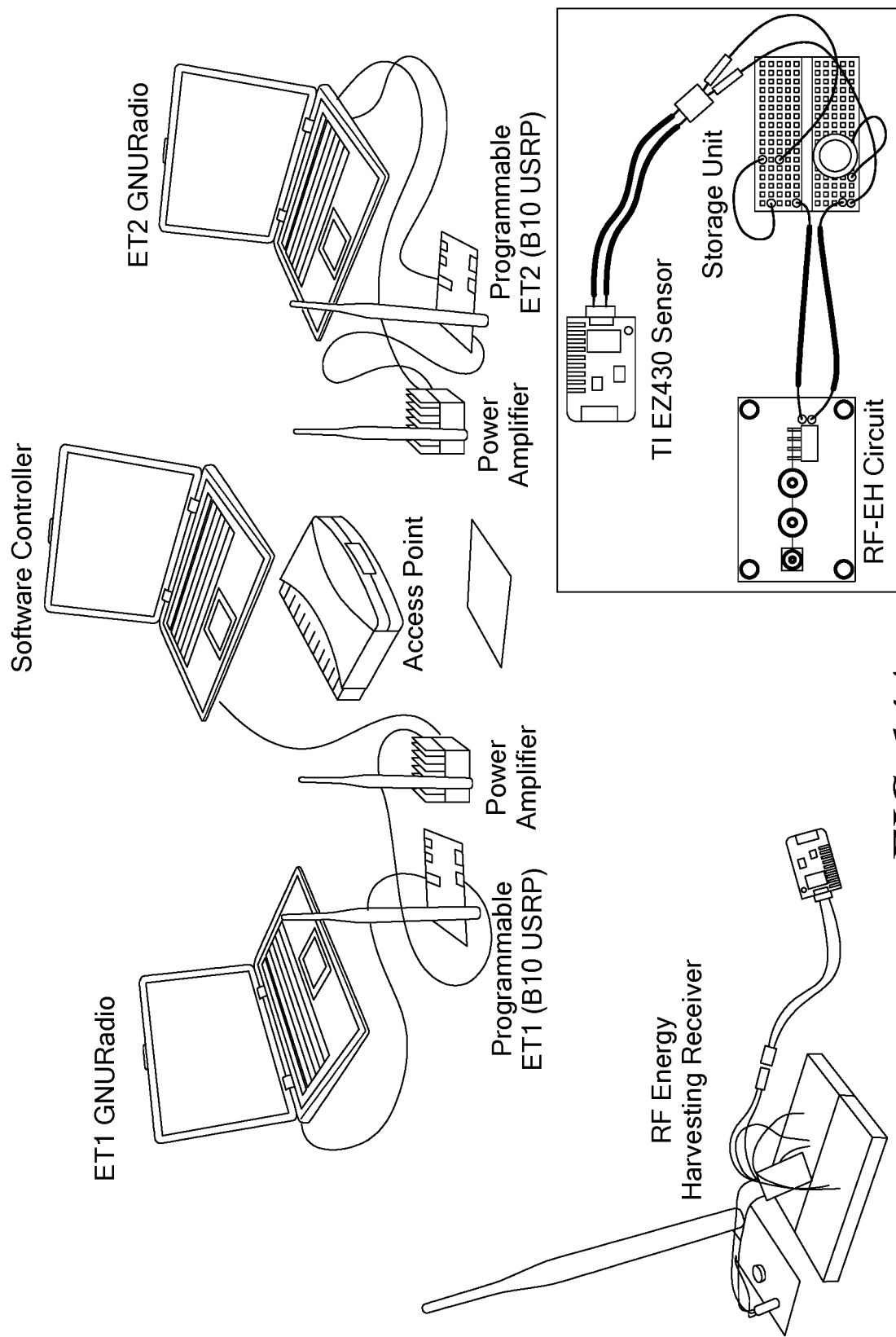
FIG. 14A is an illustration of an embodiment of a prototype system.

A prototype implementation was developed to demonstrate distributed energy beamforming to power sensor nodes. FIG. 14A shows the prototype setup, which included two programmable ETs, an RF-energy harvester circuit, and a controller. The programmable ETs were each based on a Universal Software Radio Peripheral (USRP) B210, manufactured by Ettus Research LLC, as a software-defined radio connected to a power amplifier. The USRPs were controlled with the open source USRP hardware driver (UHD), and GNURadio software. The prototype included features such as frequency synchronization, phase synchronization, and phase adjustments for forming constructive energy beams, as described above. The RF-energy harvester was fabricated and connected to a sensor device (TI EZ430) to convert RF-to-DC with high efficiency.

The RF energy harvesting circuit included an antenna, an impedance matching network sub-circuit, a 4-stage diode-based Dickson voltage rectifier, and a 3300 µF capacitor for energy storage. The impedance matching network sub-circuit with adjustable capacitors maximized the energy transfer and minimized power reflection between the antenna and the voltage rectifier. For efficient DC conversion, a 4-stage diode-based Dickson voltage rectifier was designed by choosing a Schottky diode that operates with quick activation time and lower forwarding voltage drop as the nonlinear component of rectifier. The 3300 µF capacitor was used to store the energy from the voltage rectifier, which served as the energy storage for operating the TI EZ430 sensor.

The GnuRadio software plane in the USRPs implemented the beamforming algorithm for phase and frequency synchronizations, and transferred high power energy signals toward the desired receiver at the energy harvester circuit using a power amplifier with maximum allowable power under FCC rules. Using distributed energy beamforming, the ETs were able to self-adjust their phase based on feedback from the receiver, so that maximum net energy was transferred towards the intended receiver. In particular, the ETs were able to organize themselves into a virtual antenna array and focus their transmission energy in the direction of the sensor device, such that the emitted waveforms added up constructively at the target sensor. Each ET also used an extended Kalman filter to estimate and correct the frequency offset between its carrier frequency and the feedback as reference signal.

Figure 14B:
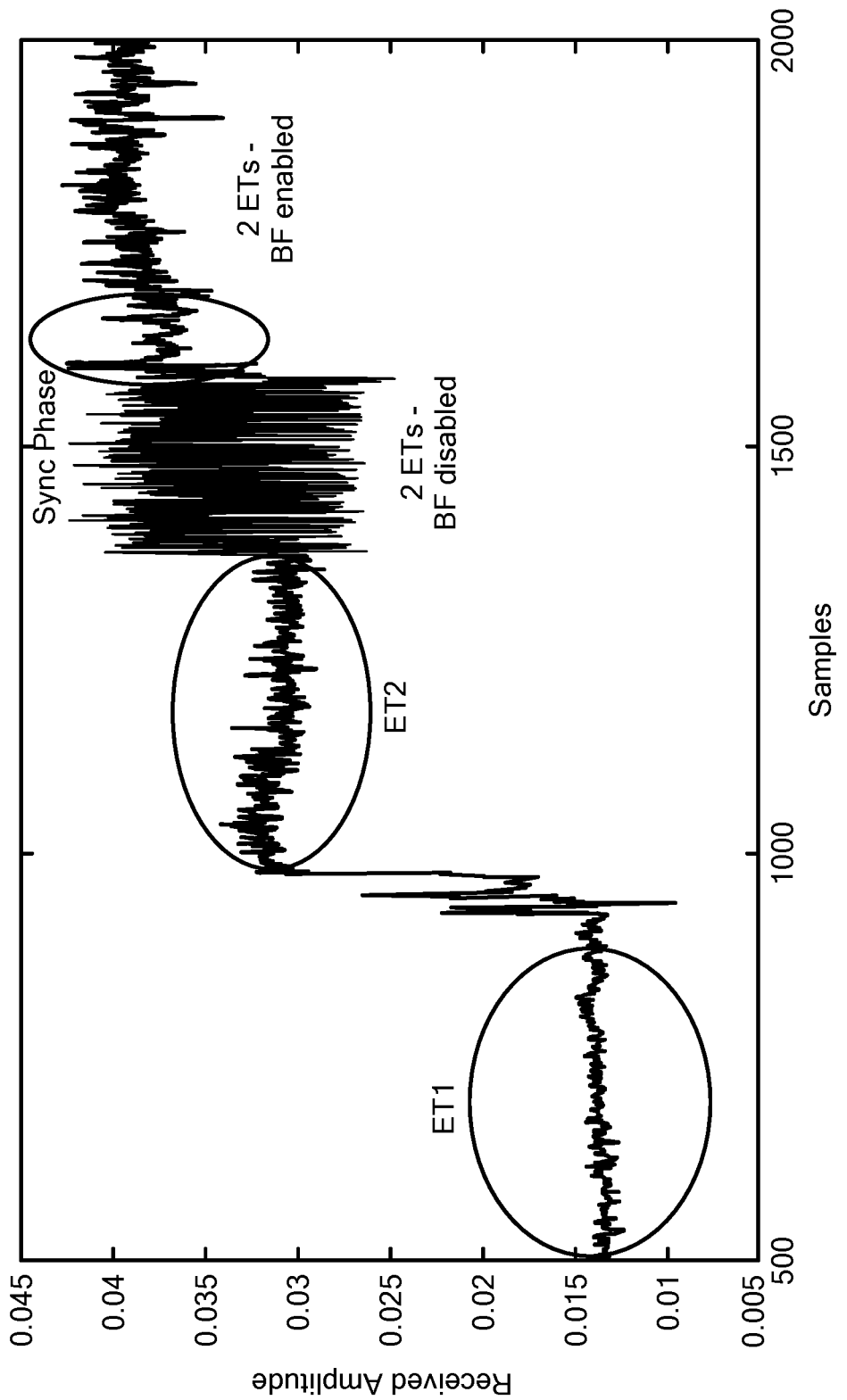
FIG. 14B is a graph illustrating a received power comparison demonstrating energy beamforming with the prototype of FIG. 14A.

FIG. 14B shows the results of the energy beamforming for two ETs, and improvements of the received power. The net conversion efficiency depends upon the accurate phase matching of the ETs and the circuit design. Once the voltage across the capacitor reached 3.6V, the sensors disconnected from the charging phase and resumed their normal operation. FIG. 14B shows the amplitude of received power for 4 cases: the first ET (ET1) was on, the second ET (ET2) was on, both ETs were on, but no distributed beamforming had been implemented, and finally two ETs were on with distributed beamforming. The results show the improvement of this method and system on the received power and also depict the durations that initial synchronization needed.

Figure 14C:
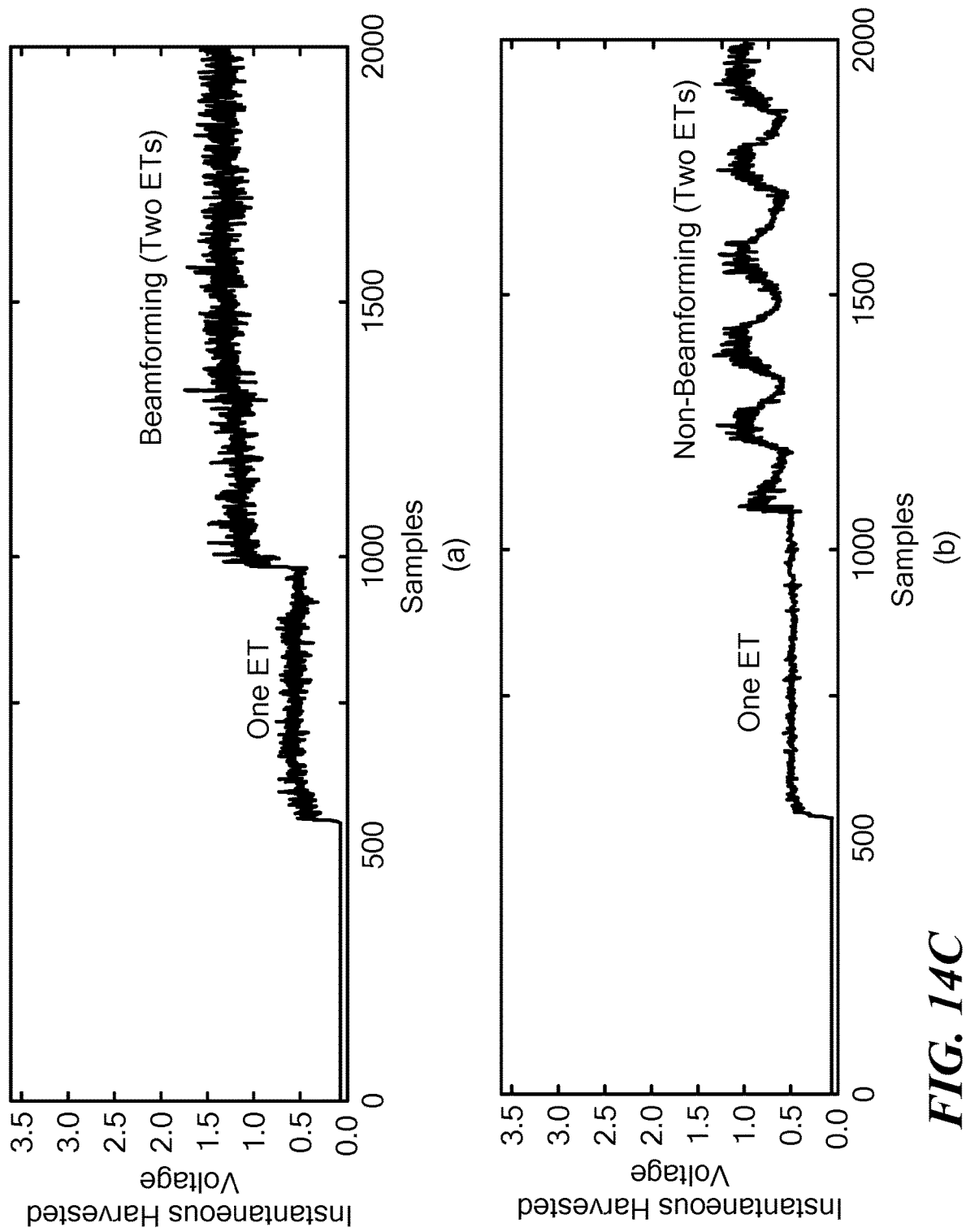
FIG. 14C is a graph comparing instantaneous harvested voltages for beamforming and non-beamforming scenarios using the prototype of FIG. 14A.

FIG. 14C shows the instantaneous harvested voltage that was measured at the output of RF energy harvesting circuit for (a) beamforming-enabled and (b) beamforming-disabled scenarios. It shows the level of harvested voltage when only one ET is turned on, and then two ETs are transmitting. The consistency of constructive interference in the case of the present beamforming-enabled implementation is demonstrated. The prototype implementation included a middleware developed to contain the software controller and communicate with both USRPs and sensor receivers for optimal managing of the hardware resources and scheduling. The controller included a Python-based control plane based on the Twisted framework. The controller accepted registration beacons emitted by the sensors and ETs. Each beacon contained not only the unique device ID, but also a description of the functions supported by the discovered device in a pre-determined format.

The USRP hardware driver was modified for the USRP devices to automatically transmit these beacons, if the device was not already registered. Twisted ran two reactor loops at both ends of the ET/sensor-controller connection, allowing each device to accept higher level directives as and when they arrived, while also allowing the controller to receive energy requests from the sensors. The controller then executed remote procedural calls, wherein it invokes specific functions in the ETs (such as tuning the center frequency and starting the beamforming algorithm) based on the incoming energy requests.

Example 2

Figure 15:
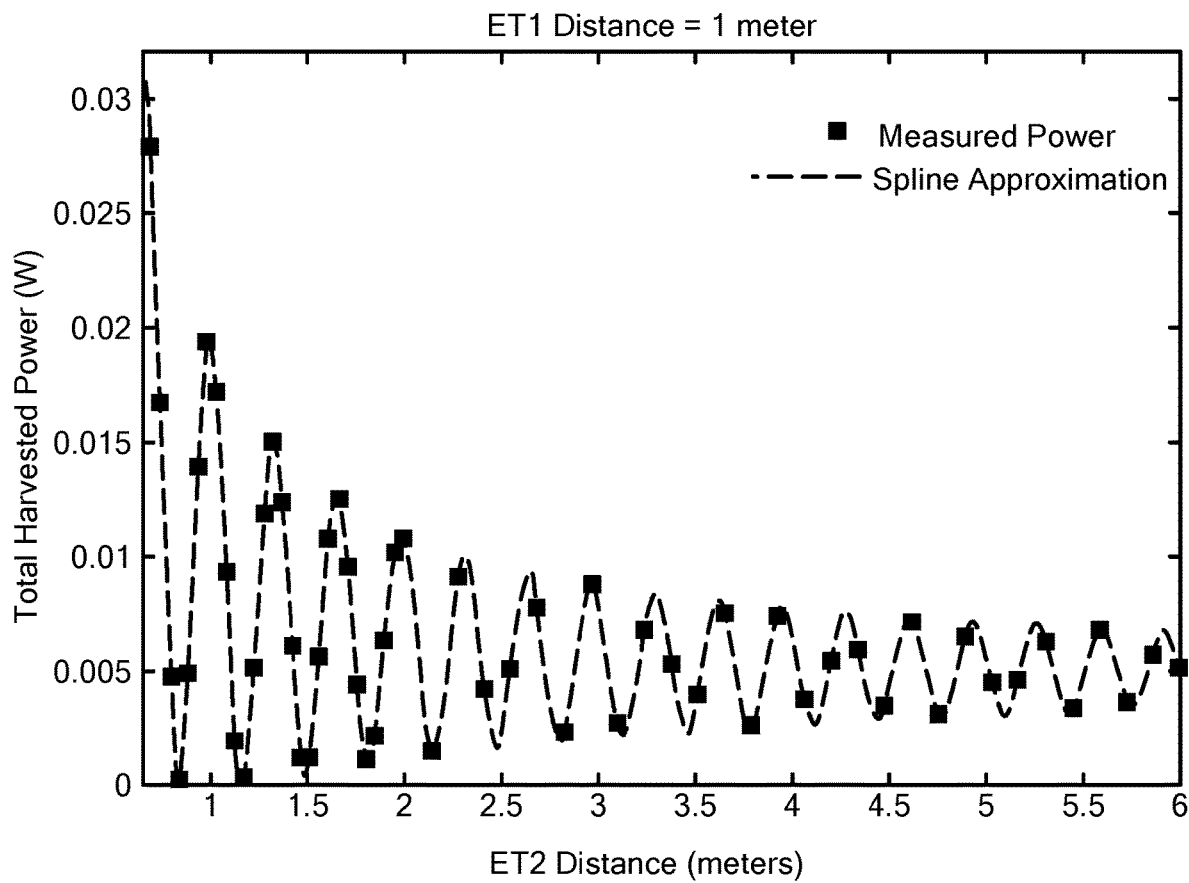
FIG. 15 is a graph illustrating experimental results on the effect of destructive and constructive energy interference for two energy transmitters (ET1 and ET2) when the distance between ET1 and the receiver is set to 1 m.

As noted above, FIG. 3 illustrates two-dimensional patterns of transferred energy produced by multiple ETs. Concurrent energy transmissions at the same frequency cancel the transferred energy in destructive areas and aggregate energy in constructive areas. Through experimental measurements, FIG. 15 illustrates the effects of constructive and destructive combinations of energy waves from two ETs. Here, the two ETs transferred energy with random initial phases at 915 MHz each with an output power of 3 Watts. The ET and RF energy harvesting circuits had antenna gains of 1 dBi and 6.1 dBi, respectively, and the capacitor storage of the receiver node was C=100 mF. The total harvested power was measured while varying the distances between energy transmitters and the receiver, which led to the different phase separations of the arriving energy waves. It can be observed that destructive interference from one ET strongly affected the energy transmitted by another ET, and at distances, all transmitted energy waves could be canceled totally. This resulted in very low or no harvested power even when all ETs were transferring energy with high power.

Example 3

Figure 16:
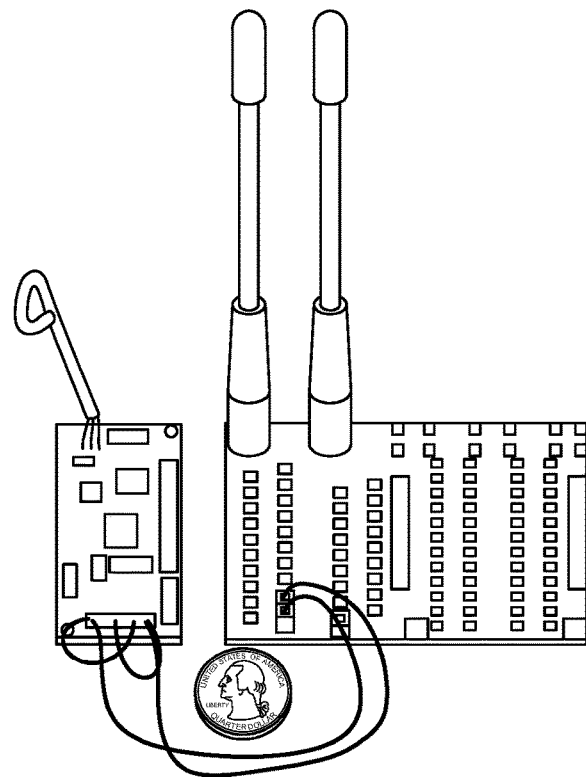
FIG. 16 illustrates a dual stage RF energy harvesting prototype.

A prototype of a dual-stage RF energy harvesting device was developed, illustrated in FIG. 16, for operation in both low power and high power regions. The prototype of the dual-stage energy harvesting circuit was based on the voltage multiplier. The prototype was designed considering all input parameters needed to obtain high power conversion efficiency from the RF energy harvester. The main components of prototype and parameters that influenced the efficiency and performance of the circuit included the multiplier topology, nonlinear components of the multiplier, and the number of stages.

Figure 17:
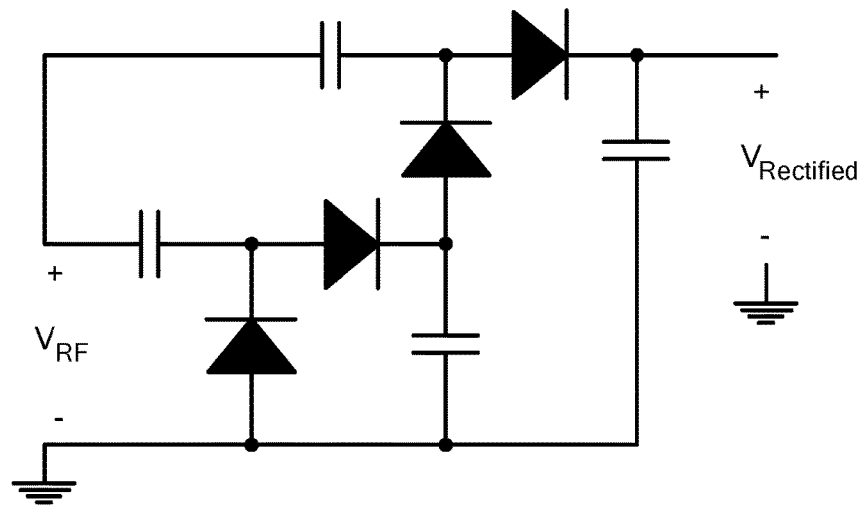
FIG. 17 is a schematic illustration of a Dickson multiplier used in the prototype of FIG. 16.

The multiplier topologies do not demonstrate a significant difference in performance. Hence, a Dickson topology (FIG. 17), which has a parallel configuration of capacitors in each stage, was chosen. This topology was advantageous in this implementation because with the capacitors connected in parallel, the effective circuit impedance was reduced. This made the task of matching the antenna side to the load side simpler.

The nonlinear components of the multiplier can be selected to enable the energy harvesting circuit to operate with weak input RF power. As the peak voltage of the RF signal obtained at the antenna is generally much smaller than the diode threshold, diodes with the lowest possible turn on voltage are preferable. Moreover, since the energy harvesting circuit is operating in high frequencies, diodes with a very fast switching time are preferred. Schottky diodes use a metal-semiconductor junction instead of a semiconductor-semiconductor junction. This allows the junction to operate much faster, and gives a forward voltage drop of as low as 0.15V. The prototype employed two different diodes from Avago Technologies, HSMS-2822 and HSMS-2852. The former has a turn on voltage of 340 mV while the latter is at 150 mV, measured at 1 mA and 0.1 mA, respectively. Consequently, HSMS-2852 was suitable for the low power design (LPD) used in the weak RF environment, while HSMS-2822 was preferred for the high power design (HPD) in the strong RF environment.

The number of multiplier stages is influential on the output voltage of the energy harvesting circuit. Each stage in this prototype was a modified voltage multiplier, arranged in series. The output voltage was directly proportional to the number of stages used in the energy harvesting circuit. However, practical constraints forced a limit on the number of permissible stages, and in turn, the output voltage. Here, the voltage gain decreased as number of stages increased due to parasitic effect of the constituent capacitors of each stage, and finally it became negligible. Due to this, a 7-stage low power region and a 10-stage high power region were chosen with the crossover point of 10.75 dBm, to yield the maximum efficiency.

Figure 19:
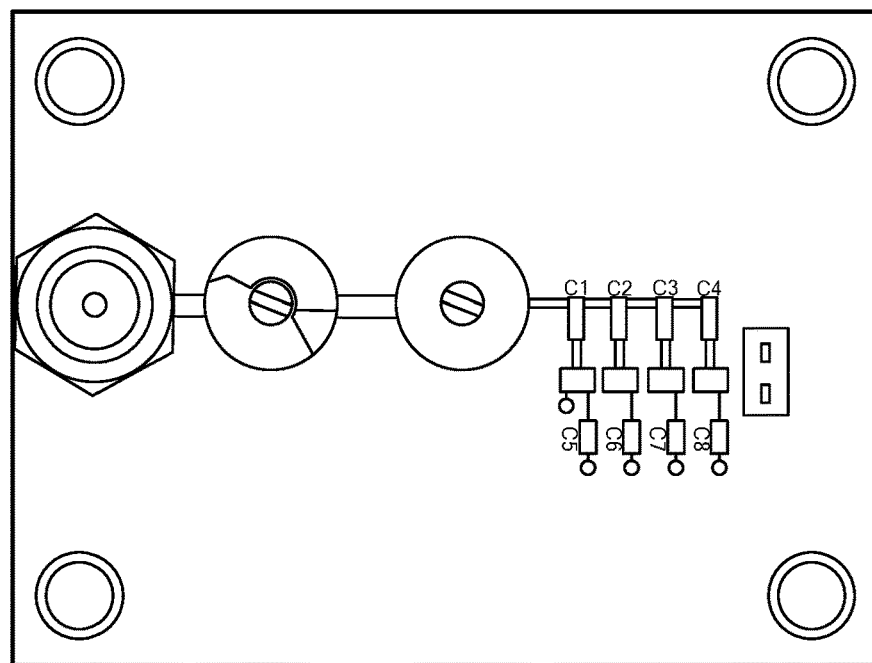
FIG. 19 is an illustration of a further ambient RF energy harvesting circuit prototype.

The printed circuit board (PCB) of the dual stage RF energy harvesting prototype was connected to a Mica2 mote (shown in FIG. 19). The PCB was fabricated with FR-4 epoxy glass substrate and had two layers, one of which served as a ground plane. The prototype components and values are summarized in Tables 1 and 2.

TABLE 1

Components for dual-stage circuit design

| Component | Value |
|---|---|
| Inductor | 3.0, 7.12 nH |
| Capacitor | 1.5, 2.9 pF |
| Stage capacitor | 36 pF |
| Diode | HSMS-2852, HSMS-2822 |

TABLE 2

Parameters used in the PCB fabrication for dual-stage circuit design

| Component | Value |
|---|---|
| Laminate thickness | 62 mil FR-4 |
| Number of layers | 2-layer, one serves as a ground plane |
| Copper thickness | 1.7 mil |
| Trace width | 20 mil with 12 mil gap |
| Dielectric constant | 4.6 |
| Through-hole size | 29 mil |

This prototype was able to continuously operate Mica2 sensor motes when their duty-cycle was selected based on the incident RF power (as low as −6 dBm). Moreover, this prototype was able to sustain the energy neutral of Texas Instruments' MSP430G2553 in LPM4 at −20 dBm. In comparisons between the efficiency of this prototype with that of the commercially available RF energy harvester from Powercast P1100, this prototype largely outperformed the Powercast P1100 in the range of −20 to −7 dBm.

Example 4

Figure 18:
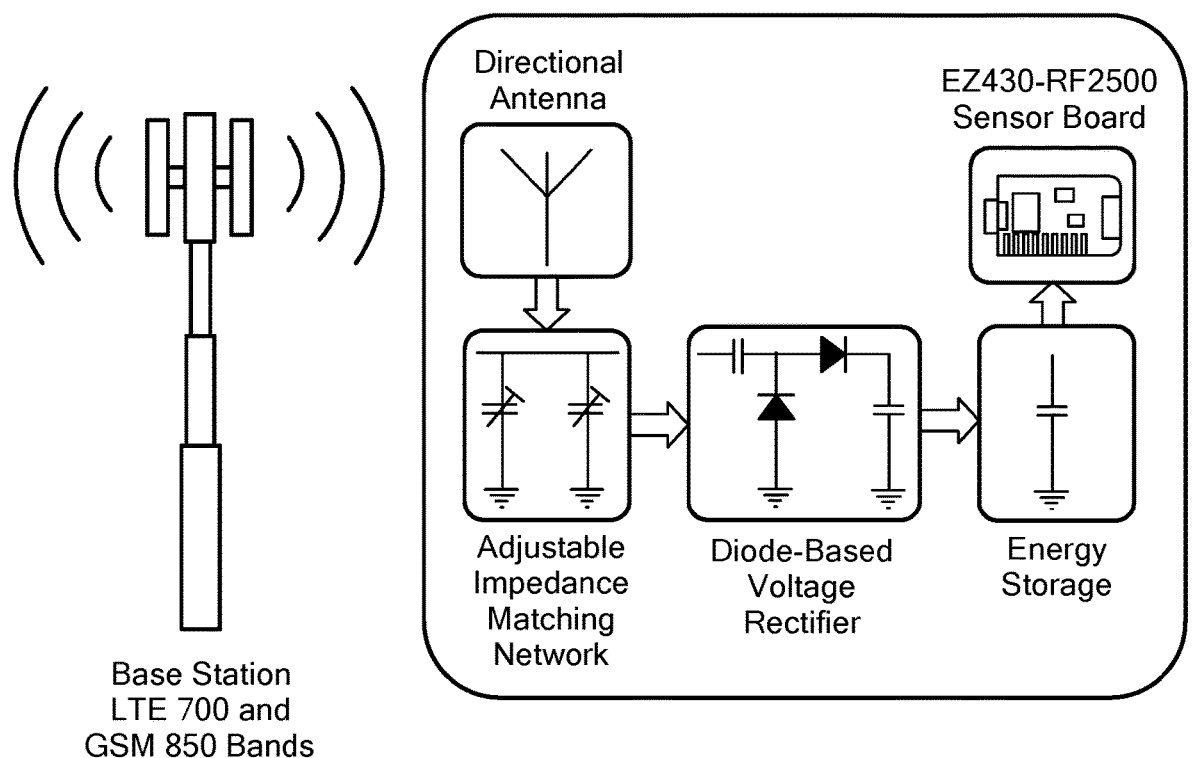
FIG. 18 is a schematic overview of an adjustable ambient RF energy harvesting system.

A prototype was provided as an adjustable ambient RF harvesting circuit to enable efficiently harvesting available energy from LTE 700, GSM 850, and ISM 900 bands with a single energy harvesting circuit. FIG. 18 schematically illustrates the components of the ambient energy harvesting circuit. The voltage multiplier included a 4-stage Dickson voltage multiplier and zero bias Schottky diode HSMS-285C to convert the incident ambient RF power into functional DC power. The impedance matching network was a modified π tunable impedance network that allowed adjustable selection of the excited frequency band according to available ambient power, such that it provided the maximum power delivery from the antenna to the voltage multiplier at the excited frequency band. The energy storage established the load smooth DC power delivery.

FIG. 19 shows the PCB of the ambient RF energy harvesting circuit prototype. The PCB board was designed with two layers, one of which served as a ground plane and was fabricated with FR-4 epoxy glass substrate. The circuit architecture and circuit components and parameters were selected according to design challenges that affect circuit performance discussed above in Example 3. The prototype used a 4-stage Dickson voltage multiplier composed of zero bias Schottky diode HSMS-285C, which has same specifications as the HSMS-2852, such as the turn-on voltage of 150 mV measured at 0.1 mA, with a smaller package size. In order to optimize the impedance matching network in the circuit, the adjustable capacitors were trimmed by using an Agilent E5061B vector network analyzer with determined ambient frequency range and RF input power level. Consequently, the prototype was tunable to the ambient signal frequency bands such as LTE 700 (734-756 MHz), GSM 850 (869-894 MHz), and ISM 900 (902-928 MHz) bands, allowing the prototype to effectively target these bands to harvest their ambient RF energy. The configuration of the prototype is summarized in Table 3.

TABLE 3

Components used in fabrication for ambient RF energy harvesting circuit

| Circuitry | Topology | Component | Value |
|---|---|---|---|
| Multiplier | Dickson diode-based | Diode | HSMS-285C |
| | Four Stage | Stage Capacitor | 100 pF |
| Impedance Matching | Adjustable-configured | Shunt Trimmer 1 | 2.2-22 pF |
| Network | Modified π network | Shunt Trimmer 2 | 3-36 pF |
| Energy Storage | | Capacitor | 3300 μF |

The prototype was able to constantly operate a TI eZ430-RF2500 sensor in battery-less operation mode at different environmental locations of Boston with power conversion efficiencies of up to 45% at LTE 700, GSM 850, and ISM 900 bands. Moreover, the prototype was able to operate extremely low-power Texas Instruments' microcontroller units such as MSP430L092 and MSP430G2553 in different operation modes for example, active, standby and LPM4 mode at input RF power range between −25 and −5 dBm.

Example 5

Figure 20:
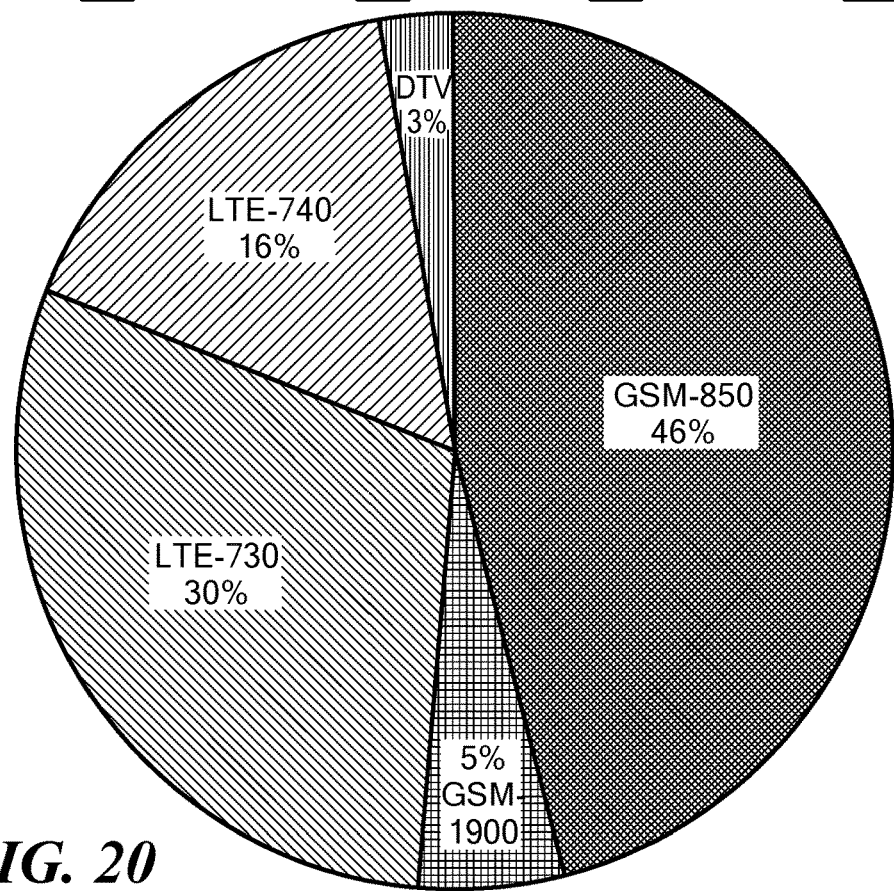
FIG. 20 illustrates percentages that each ambient channel won the highest measured power over Boston subway stations.
Figure 21:
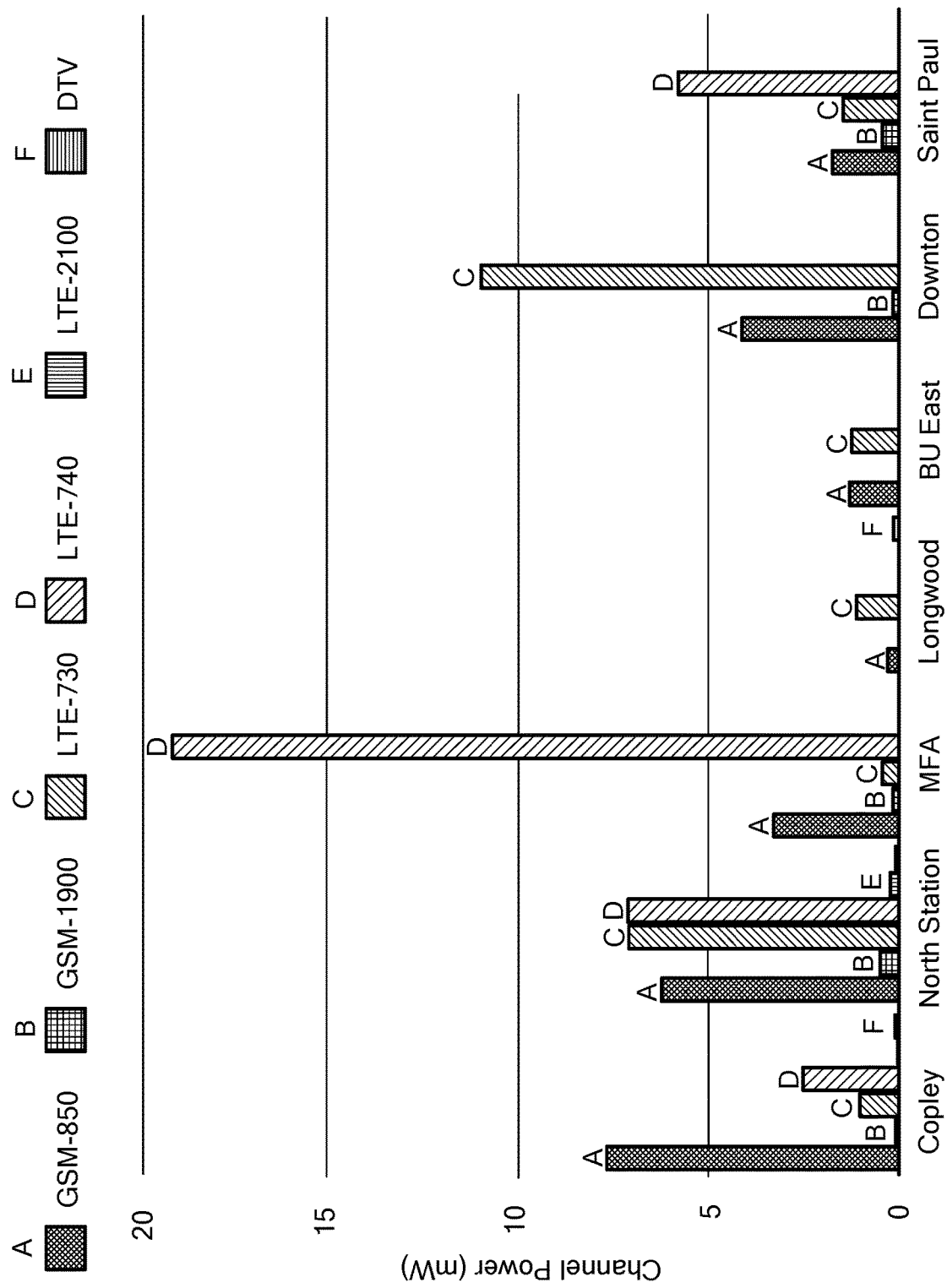
FIG. 21 illustrates the spatial diversity of measured ambient RF powers over seven Boston MBTA stations.

In order to study and demonstrate the feasibility of harvesting ambient RF power, an RF spectral survey at GSM850, GSM1900, LTE730, LTE740, and DTV bands was conducted within the Boston area in Massachusetts. The ambient spectrum studies were undertaken from outside of 40 subway stations at street level as survey points that are distributed in the city to measure the available RF power within each ambient band. A USRP2 device with a WBX antenna manufactured by Ettus Research LLC was used, and it was calibrated in the laboratory with an Agilent N9000 signal analyzer. The percentages of each ambient RF signal band in which the highest power are measured over all locations were calculated as 46%, 5%, 30%, 16% and 3% for GSM850, GSM1900, LTE730, LTE740, and DTV, respectively as seen in FIG. 20. This implies that 92% available ambient RF power is covered by LTE700 and GSM850 bands. The banded input RF power in mW was calculated by summing and averaging over all received power across the band in a similar way the spectrum analyzer calculates channel power. Table 4 summarizes the results across all subway stations indicating the frequencies, average, maximum, median, and standard deviation for all banded power measurements. It can be observed that RF ambient powers can be relatively high and suitable for harvesting. In addition, FIG. 21 illustrates the spatial diversity of ambient powers over seven Boston subway stations, which is also an indication of the advantage and usability of available RF ambient power in addition to controlled beams, especially in applications with longer required periods of charging.

TABLE 4

| Band | GSM850 | GSM1900 | LTE730 | LTE740 | DTV |
|---|---|---|---|---|---|
| Frequencies (MHz) | 869-894 | 1930-1950 | 734-744 | 746-756 | 494-584 |
| Average (mW) | 1.8153 | 0.1335 | 1.4193 | 1.4029 | 0.0547 |
| Maximum (mW) | 10.3474 | 0.5226 | 13.0601 | 19.1625 | 0.3038 |
| Median (mW) | 0.7938 | 0.0821 | 0.2869 | 0.0825 | 0.0362 |
| StDev | 2.4500 | 0.1351 | 2.9876 | 3.5793 | 0.0610 |

Radiated Power (EIRP) is equal to 1. EIRP is the total effective radiated power from an antenna, which includes transmitted power, gains that the antenna provides, and losses from the antenna cable. In addition, FIG. 22B compares the charging times of mentioned scenarios for different EIRPs when distance from the ETs to the receiver is set to 2 m.

Figure 23:
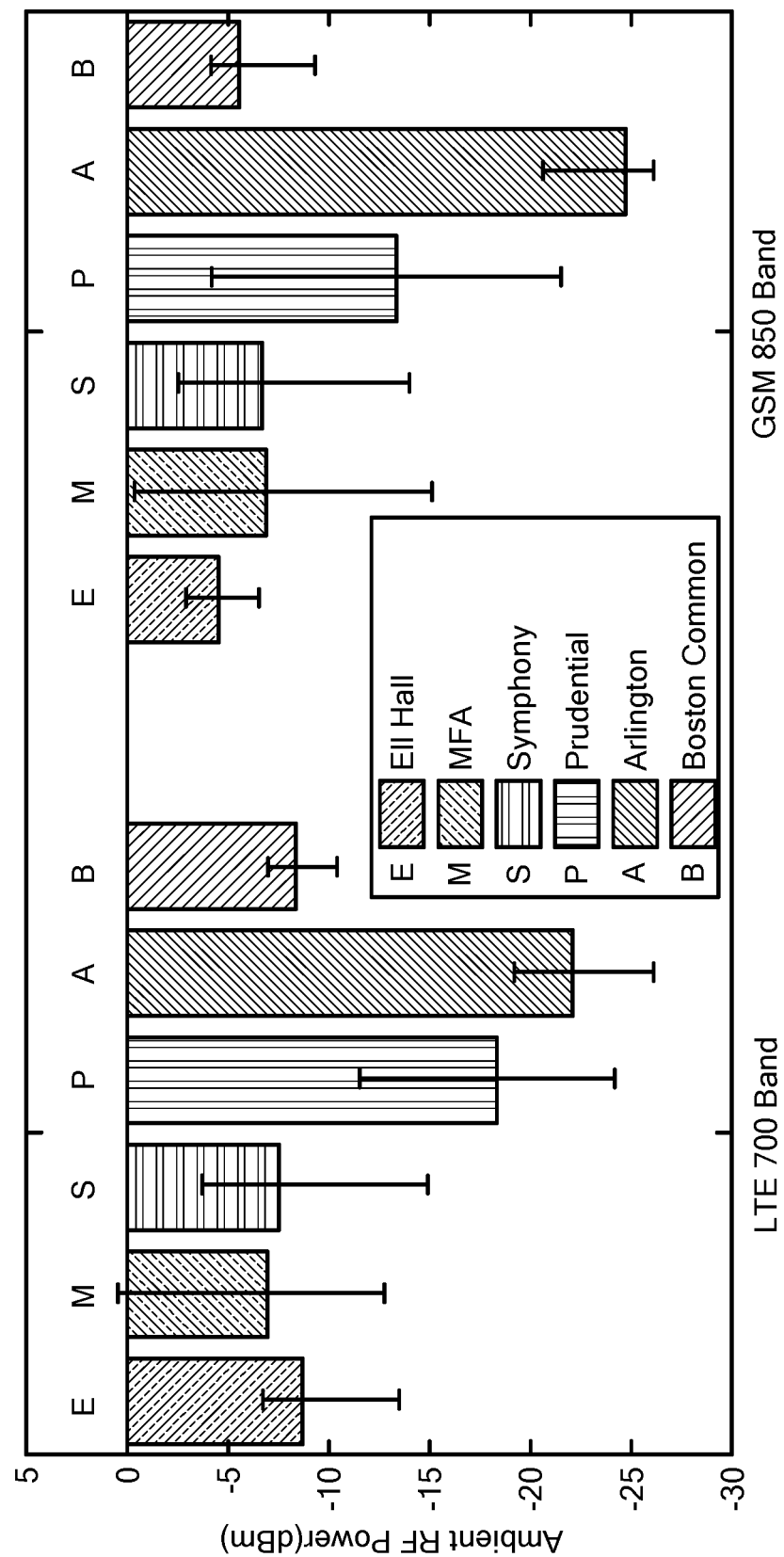
FIG. 23 illustrates levels of average RF power over a set of places such as a subway station, university, museum, shopping center, and park in Boston.

In the light of initial RF survey, for the next step, the available ambient RF power at LTE700 and GSM850 bands was measured using the prototype of Example 4 within six different locations in Boston, a university, a museum, a shopping center, outside of a subway station, a park, and a concert theater. These particular locations were selected to help comprehend the disparities and similarities among results in terms of geographical terrain and population distribution and density when investigating energy level in such environments. Table 5 gives a review of the locations where experiments were done. The measurement samples were obtained with a 30-minute section at each location and each section was repeated at the same time and same location for 5 days. Using dataset from survey of signal strength distribution in Boston, FIG. 23 depicts levels of average ambient RF power at determined frequencies over a set of locations with maximum and minimum levels of ambient RF power. This indicates that more that 65% of determined locations in Boston have enough RF power density to operate a low-power sensor mote in a battery-less operation mode.

TABLE 5

Statistical summary of available ambient RF powers over Boston

| Index Name | Location Description | Experimental Time-line | Frequency Band | μ (dBm/s) | σ (μ) |
|---|---|---|---|---|---|
| MFA-1 | Museum of Fine Arts; outdoor | Jul. 26, 2016-Jul. 30, 2016 | LTE (734 MHz-756 MHz) | −6.7 | 1.818 |
| MFA-2 | Museum of Fine Arts; outdoor | Aug. 1, 2016-Aug. 5, 2016 | GSM (869 MHz-894 MHz) | −6.9 | 2.017 |
| Ell Hall-1 | Northeastern University, Krentzman Quadrangle; outdoor | Jul. 26, 2016-Jul. 30, 2016 | LTE (734 MHz-756 MHz) | −8.7 | 0.284 |
| Ell Hall-2 | Northeastern University, Krentzman Quadrangle; outdoor | Aug. 1, 2016-Aug. 5, 2016 | GSM (869 MHz-894 MHz) | −4.5 | 0.286 |
| Symphony-1 | Symphony Hall; outdoor | Aug. 3, 2016-Aug. 7, 2016 | LTE (734 MHz-756 MHz) | −7.5 | 0.959 |
| Symphony-2 | Symphony Hall; outdoor | Aug. 8, 2016-Aug. 12, 2016 | GSM (869 MHz-894 MHz) | −6.7 | 0.883 |
| Prudential-1 | Prudential Tower; outdoor | Aug. 8, 2016-Aug. 12, 2016 | LTE (734 MHz-756 MHz) | −18.3 | 1.308 |
| Prudential-2 | Prudential Tower; outdoor | Aug. 12, 2016-Aug. 14, 2016 | GSM (869 MHz-894 MHz) | −13.3 | 0.851 |
| Arlington-1 | Arlington, near the subway station; outdoor | Aug. 15, 2016-Aug. 19, 2016 | LTE (734 MHz-756 MHz) | −22.1 | 0.468 |
| Arlington-2 | Arlington, near the subway station; outdoor | Aug. 15, 2016-Aug. 19, 2016 | GSM (869 MHz-894 MHz) | −24.7 | 0.338 |
| Boston Common-1 | Boston Common Public Park; outdoor | Aug. 16, 2016-Aug. 20, 2016 | LTE (734 MHz-756 MHz) | −8.3 | 0.21 |
| Boston Common-2 | Boston Common Public Park; outdoor | Aug. 16, 2016-Aug. 20, 2016 | GSM (869 MHz-894 MHz) | −5.5 | 0.143 |

Figure 22A:
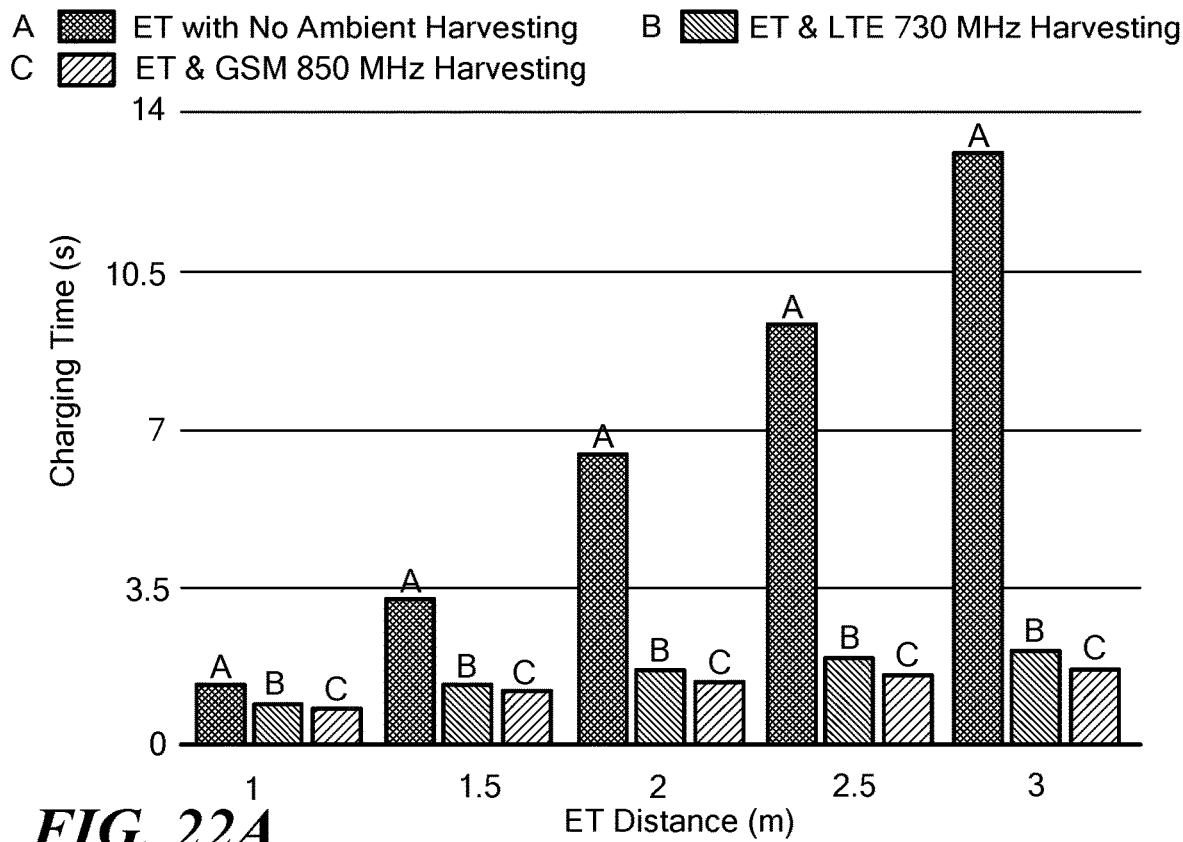
FIG. 22A illustrates a comparison of charging times for three scenarios (ET with no ambient harvesting, ET and LTE 730 MHz harvesting, and ET and GSM 850 MHz harvesting) over varying ET distances and ET EIRP equal to 1.
Figure 22B:
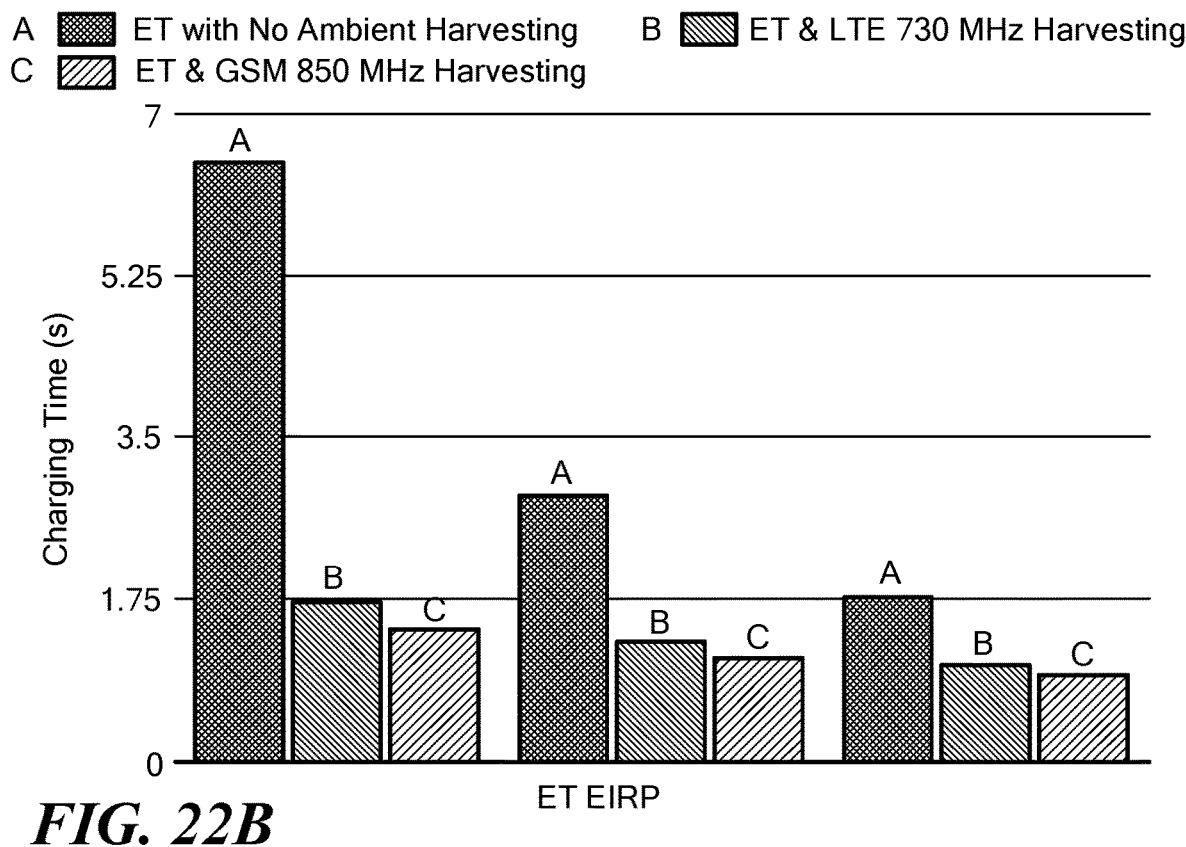
FIG. 22B illustrates a comparison of charging times for three scenarios (ET with no ambient harvesting, ET and LTE 730 MHz harvesting, and ET and GSM 850 MHz harvesting) over varying ET EIRPs and ET distance equal to 2 m.

Based on this ambient RF survey, FIGS. 22A and 22B compare the charging times needed to power a Nordic nRF51822 low-energy Bluetooth radio for transmission of one packet in three scenarios: i) ET wireless transfer without any ambient harvesting, ii) ET wireless transfer with ambient harvesting at LTE 730 MHz, and iii) ET wireless transfer with ambient harvesting at GSM 850 MHz. FIG. 22A illustrates the charging time comparisons for different distances of ET to receiver device, when ET Effective Isotropic Example 6

Figure 24A:
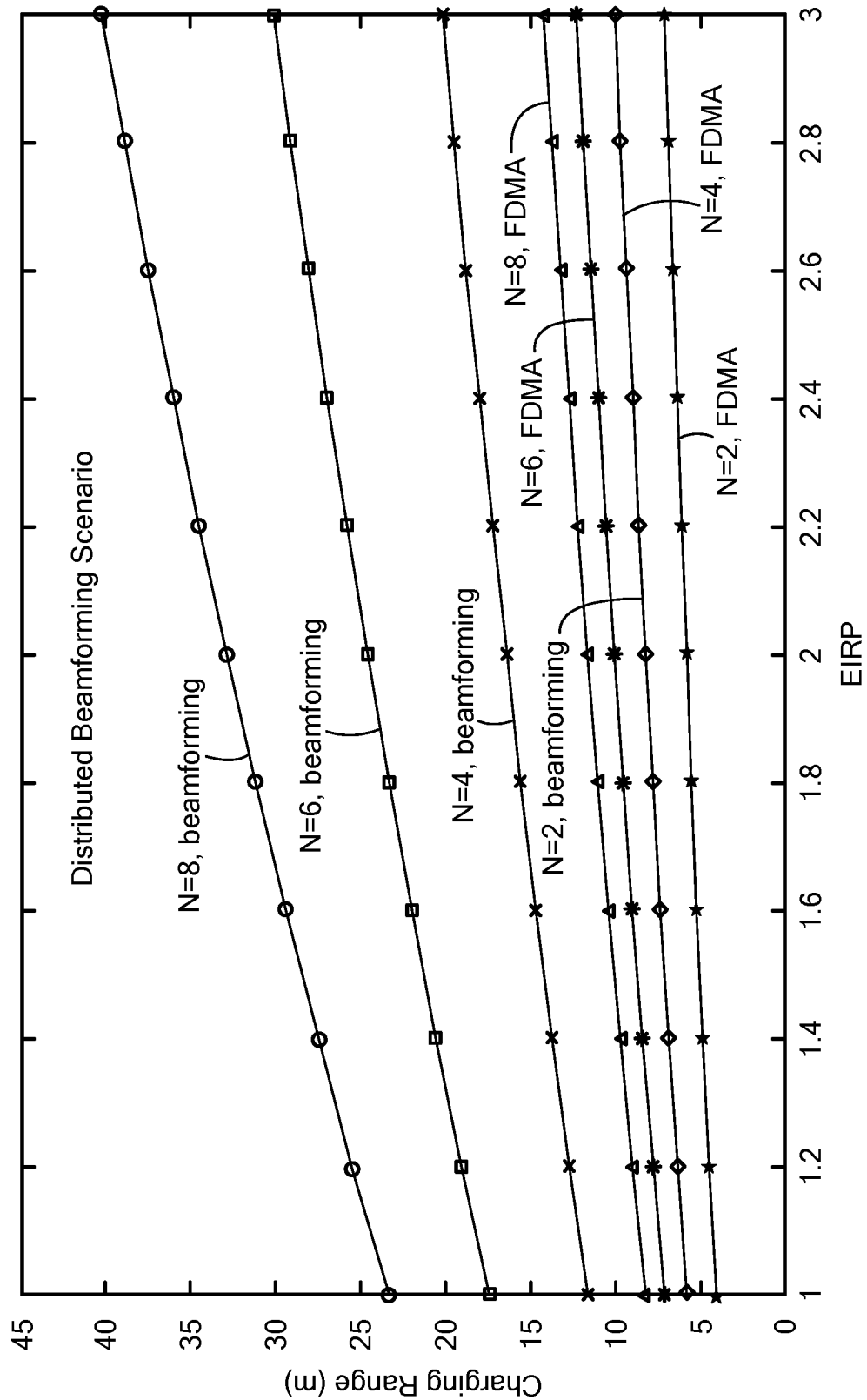
FIGS. 24A and 24B illustrate improvements of distributed beamforming in terms of charging ranges (FIG. 24A) and harvesting rates (FIG. 24B).
Figure 24B:
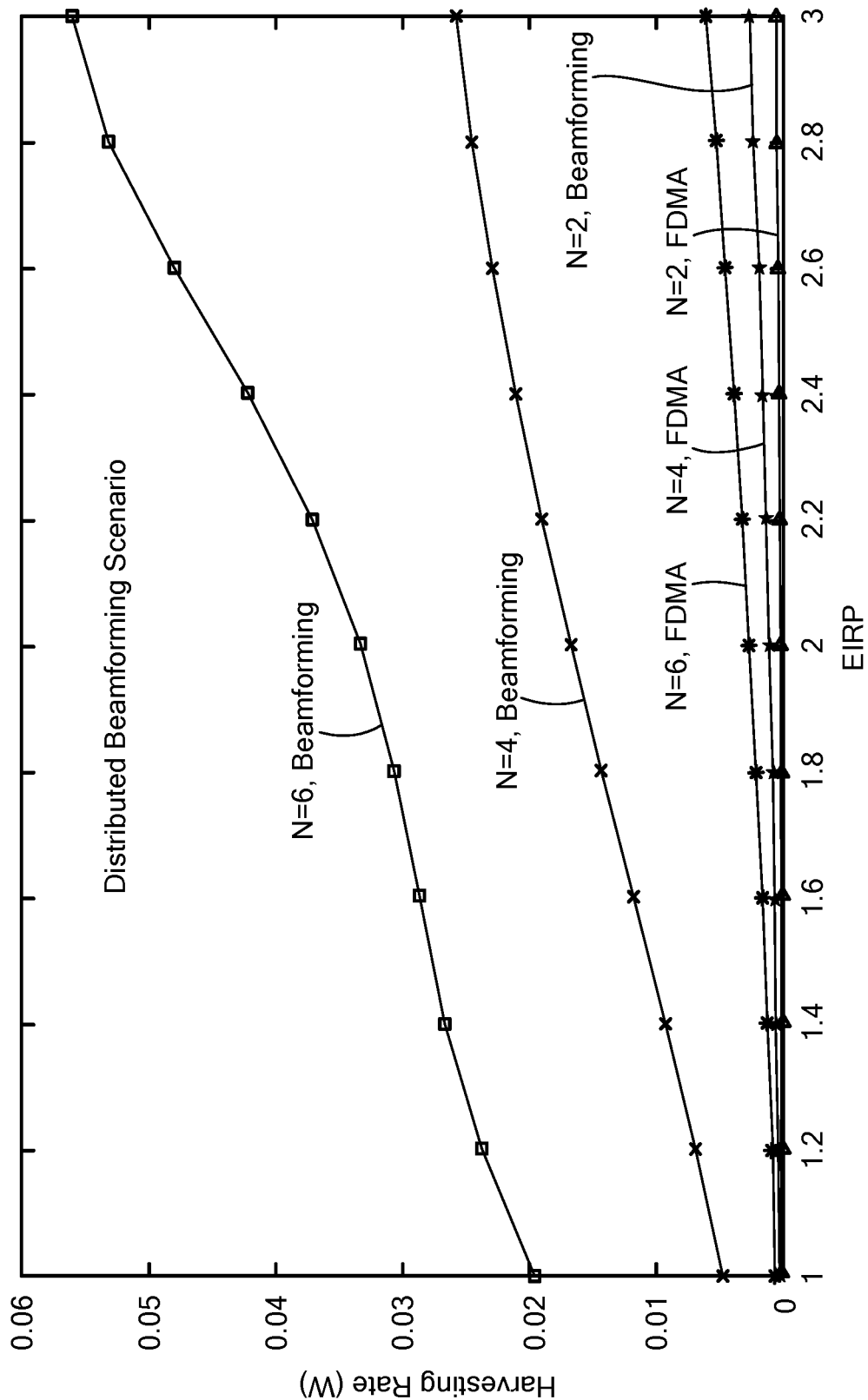

The system and method can provide higher wireless charging rates as well as charging distances through spatially distributed wireless beamforming compared to omni-directional RF energy transfer. FIG. 24A illustrates a comparison of the maximum charging ranges between FDMA (i.e. omni-directional energy transfer at different frequencies) and energy beamforming, when the minimum input power for the RF harvesting circuit is −5 dBm. It demonstrates the significant increase of charging range when beamforming is utilized as described herein. On the other hand, FIG. 24B illustrates the harvesting rates that resulted from energy beamforming in comparison with FDMA, when ETs were placed at a distance of two meters. The improvements in harvesting rates due to beamforming as the Effective Isotropic Radiated Power (EIRP) increased can be seen. It is noteworthy that the energy transfers at the same frequency without beamforming resulted in random destructive interference.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A method for distributed wireless charging, comprising:
in a network comprising at least two spatially distributed energy transmitters, a plurality of energy receiving target devices, and a controller comprising one or more processors and memory, and machine readable instructions stored in the memory executable by the one or more processors, the steps of, at the controller:
receiving a communication from at least one energy receiving target device or from one of the energy transmitters comprising a need for energy by one or more of the energy receiving target devices; and;
transmitting to the at least two energy transmitters, instructions for wireless transmission of radio frequency (RF) energy from the at least two energy transmitters to form constructive interference at an identified energy receiving target device, wherein the at least two energy transmitters are operative to coordinate adjustment of one or more of a frequency, a phase, and a time of transmission of the RF energy to form constructive energy beams at the identified energy receiving target device; and
wherein each of the energy transmitters comprises a software-defined radio configurable by communications from the controller, and an antenna in communication with the software-defined radio, and each of the energy transmitters is switchable between an energy transmission mode and an active data communication mode using a wireless data communication protocol for the network;
wherein the controller is further operative to
transmit instructions including scheduling transmissions of energy over time to each of the energy receiving target devices;
apportion energy transmission between multiple ones of the energy receiving target devices based on current energy levels of each energy receiving target device, a number of the energy receiving target devices, and an estimated future energy demand;
register, authenticate or track a location of each of the multiple energy receiving target devices; or
store an energy map in the memory, the energy map comprising an updatable compilation of present and historical energy levels of the multiple energy receiving target devices.

2. The method of claim 1, further comprising:
converting energy contained in the RF energy into electrical energy by energy harvesting circuitry in the energy receiving target device for immediate use or for storage.

3. The method of claim 1, wherein the instructions transmitted by the controller include a power level to be transmitted, a duration of transmission, an identification of one of the energy receiving target devices to receive transmission, and a schedule of transmission.

4. The method of claim 1, wherein the instructions transmitted by the controller include one or more of switching the energy transmitters on and off, changing a power level transmitted by each of the energy transmitters, and changing a duration of energy transmission of each of the energy transmitters.

5. The method of claim 1, wherein the instructions transmitted by the controller include active data communication protocols, the communications protocols including at least WiFi, ZigBee, and Bluetooth protocols; a role of each energy transmitter, the roles including an energy transfer mode and a data access point communication mode; and a duration of the roles of the energy transmitters.

6. The method of claim 1, further comprising transmitting, from one or more of the energy receiving target devices to one or more of the energy transmitters or to the controller, an indication of one or more of an energy discharging rate, an ambient RF energy harvesting rate, or an energy storage level at the energy receiving target device.

7. The method of claim 1, further comprising:
transmitting feedback, from the identified energy receiving target device to one or more of the energy transmitters, comprising an indication of a received signal strength from the energy transmitters or channel estimations; and
in response to the feedback, iteratively adjusting one or more of frequency, phase, or timing of the RF energy from one or more of the energy transmitters to optimize constructive interference at the identified energy receiving target device.

8. The method of claim 1, wherein the energy receiving target device further harvests RF energy from an ambient RF source, wherein the ambient RF source includes radio signals, cellular signals, global system for mobile (GSM) signals, or digital or analog television signals.

9. The method of claim 1, wherein one or more of the energy transmitters further comprise a data access point or a gateway for the network.

10. The method of claim 1, wherein the energy receiving target device is a sensor, an Internet of Things-enabled device or appliance, a mobile device, an air-borne device, a wearable device, an implantable device, or a computing device.

11. The method of claim 1, wherein the energy receiving target device includes energy harvesting circuitry operative to convert energy contained in RF energy into electrical energy for immediate use or for storage; the energy harvesting circuitry including:
   an antenna, a DC voltage rectifier in communication with the antenna, and an energy storage device in communication with the DC voltage rectifier, the energy storage device comprising a battery or a capacitor;
   a stage optimized for high RF to DC conversion efficiency for low input power levels and a stage optimized for high input power levels; or
   impedance matching circuitry to optimize RF to DC conversion efficiency over a desired frequency range.

12. A system for distributed wireless charging, comprising:
   a network comprising at least two spatially distributed energy transmitters, a plurality of energy receiving target devices, and a controller comprising one or more processors and memory, and machine readable instructions stored in the memory executable by the one or more processors, the controller operative to carry out operations comprising:
   receiving a communication from at least one energy receiving target devices or from one of the energy transmitters comprising a need for energy by one or more of the energy receiving target devices; and
   transmitting to the at least two energy transmitters instructions for wireless transmission of radio frequency energy from the at least two energy transmitters to form constructive interference at an identified energy receiving target device, wherein the at least two energy transmitters are operative to coordinate adjustment of one or more of a frequency, a phase, and a time of transmission of the RF energy to form constructive energy beams at the identified energy receiving target device;
   wherein each of the energy transmitters comprises a software-defined radio configurable by communications from the controller, and an antenna in communication with the software-defined radio, and is switchable between an energy transmission mode and an active data communication mode using a wireless data communication protocol for the network;
   wherein the controller is further operative to:
   transmit instructions including scheduling transmissions of energy over time to each of the energy receiving target devices;
   apportion energy transmission between multiple ones of the energy receiving target devices based on current energy levels of each energy receiving target device, a number of the energy receiving target devices, and an estimated future energy demand;
   register, authenticate or track a location of each of the multiple energy receiving target devices; or
   store an energy map in the memory, the energy map comprising an updatable compilation of present and historical energy levels of the multiple energy receiving target devices.

13. The system of claim 12, wherein the controller is operative to perform one or more of:
   transmitting instructions including one or more of a power level to be transmitted, a duration of transmission, an identification of the energy receiving target device, and a schedule of transmission;
   transmitting instructions including one or more of switching the energy transmitters on and off, changing a power level transmitted by each of the energy transmitters, and changing a duration of energy transmission of each of the energy transmitters; and
   transmitting instructions including active data communication protocols, the communications protocols including at least WiFi, ZigBee, and Bluetooth protocols; a role of each energy transmitter, the roles including an energy transfer mode and a data access point communication mode; and a duration of the roles of the energy transmitters.

14. The system of claim 12, wherein each of the energy transmitters:
   is operative to optimize constructive interference at the identified energy receiving target device in response to the feedback, by iteratively adjusting one or more of frequency, phase, or timing of the RF energy; or
   comprises a data access point or a gateway for the network.

15. The system of claim 12, wherein the energy receiving target device includes energy harvesting circuitry operative to convert energy contained in the RF energy into electrical energy for immediate use or for storage, and one or more of:
   wherein the energy harvesting circuitry includes an antenna, a DC voltage rectifier in communication with the antenna, and an energy storage device in communication with the DC voltage rectifier, wherein the energy storage device comprises a battery or a capacitor;
   wherein the energy harvesting circuitry includes a stage optimized for RF energy conversion efficiency at low input power levels and a stage optimized for RF energy conversion efficiency at high input power levels;
   wherein the energy harvesting circuitry includes impedance matching circuitry to optimize RF energy conversion efficiency over a desired frequency range;
   wherein the energy receiving target device is operative to further harvest RF energy from an ambient RF source, and wherein the ambient RF source includes radio signals, cellular signals, global system for mobile (GSM) signals, or digital or analog television signals;
   wherein the energy receiving target device is operative to transmit, to one or more of the energy transmitters or to the controller, an indication of one or more of an energy discharging rate, an ambient RF energy harvesting rate, or an energy storage level at the energy receiving target device; and
   wherein the energy receiving target device is operative to transmit, to one or more of the energy transmitters, feedback comprising an indication of a received signal strength from the energy transmitters or channel estimations.

16. The system of claim 12, wherein the energy receiving target device is a sensor, a sensor mote, an Internet of Things-enabled device or appliance, a mobile device, an air-borne device, a wearable device, an implantable device, or a computing device.

17. A control system for distributed wireless charging, comprising:
   a controller comprising one or more processors and memory, and machine-readable instructions stored in the memory that, upon execution by the one or more processors cause the system to carry out operations comprising:

receiving a communication from at least one of a plurality of energy receiving target devices or from one of at least two energy transmitters comprising a need for energy by the at least one energy receiving target device; and transmitting to the at least two energy transmitters instructions for wireless transmission of radio frequency energy from the at least two energy transmitters to form constructive interference at one or more of the plurality of energy receiving target devices, the instructions including a power level to be transmitted, a duration of transmission, an identification of the one or more energy receiving target devices to receive transmission, and a schedule of transmission;

wherein each of the energy transmitters comprises a software-defined radio configurable by communications from the controller, and an antenna in communication with the software-defined radio, and each of the energy transmitters is switchable between an energy transmission mode and an data communication mode using a wireless data communication protocol for the network;

wherein the controller is further operative to transmit instructions including scheduling transmissions of energy over time to each of the energy receiving target devices;

apportion energy transmission between multiple ones of the energy receiving target devices based on current energy levels of each energy receiving target device, a number of the energy receiving target devices, and an estimated future energy demand;

register, authenticate or track a location of each of the multiple energy receiving target devices; or store an energy map in the memory, the energy map comprising an updatable compilation of present and historical energy levels of the multiple energy receiving target devices.

18. The control system of claim 17, wherein the controller is operative to:

transmit instructions including one or more of switching the energy transmitters on and off, changing a power level transmitted by each of the energy transmitters, and changing a duration of energy transmission of each of the energy transmitters;

transmit instructions including use of one or more of active data communication protocols, the communications protocols including at least WiFi, ZigBee, and Bluetooth protocols; a role of each energy transmitter, the roles including an energy transfer mode and a data access point communication mode; and a duration of the roles of the energy transmitters.

* * * * *